United States Patent [19]

DiBiase et al.

[11] Patent Number: 4,740,322

[45] Date of Patent: Apr. 26, 1988

[54] SULFUR-CONTAINING COMPOSITIONS, AND ADDITIVE CONCENTRATES, LUBRICATING OILS, METAL WORKING LUBRICANTS AND ASPHALT COMPOSITIONS CONTAINING SAME

[75] Inventors: Stephen A. DiBiase, Euclid; Roger L. Sowerby, Mentor, both of Ohio

[73] Assignee: The Lubrizol Corporation, Wickliffe, Ohio

[21] Appl. No.: 824,490

[22] Filed: Jan. 31, 1986

Related U.S. Application Data

[63] Continuation-in-part of Ser. No. 760,186, Jul. 29, 1985, abandoned.

[51] Int. Cl.$^4$ ............... C10M 105/08; C10M 105/56; C10M 105/72
[52] U.S. Cl. ................................. 252/47.5; 252/45; 252/48.4; 252/48.6; 252/48.8
[58] Field of Search .................. 252/47.5, 45, 48.4, 252/48.6, 48.8; 568/72; 106/274

[56] References Cited

U.S. PATENT DOCUMENTS

| | | | |
|---|---|---|---|
| Re. 27,331 | 4/1972 | Coleman | 252/47.5 |
| 2,012,446 | 8/1935 | McKinley et al. | 260/17 |
| 2,599,350 | 6/1952 | Rudel et al. | 252/47.5 |
| 2,605,193 | 7/1952 | Karll | 106/274 |
| 2,985,590 | 5/1961 | Morway et al. | 252/47.5 |
| 3,130,159 | 4/1964 | Stedt | 252/47.5 |
| 3,133,020 | 5/1964 | Scott | 252/52 R |
| 3,221,056 | 11/1965 | Louthan | 260/583 |
| 3,231,558 | 1/1966 | McMillen | 260/139 |
| 3,317,447 | 5/1967 | Black et al. | 260/28.5 |
| 3,419,614 | 12/1968 | Doss | 260/583 |
| 3,825,495 | 7/1974 | Newingham et al. | 252/32.7 |
| 3,843,534 | 10/1974 | Gates et al. | 252/45 |
| 3,926,822 | 12/1975 | Habiby | 252/48.6 |
| 3,953,347 | 4/1976 | Habiby | 252/48.6 |
| 4,119,549 | 10/1978 | Davis | 252/47.5 |
| 4,166,795 | 9/1979 | Recchuite | 252/48.6 |
| 4,166,796 | 9/1979 | Recchuite | 252/48.6 |
| 4,166,797 | 9/1979 | Recchuite | 252/48.6 |
| 4,188,300 | 2/1980 | Sanson et al. | 252/48.6 |
| 4,191,659 | 3/1980 | Davis | 252/45 |
| 4,283,230 | 8/1981 | Clementoni et al. | 106/74 |
| 4,283,293 | 8/1981 | Schick et al. | 252/32 |
| 4,298,397 | 11/1981 | Burris et al. | 106/274 |
| 4,302,255 | 11/1981 | Kidwell et al. | 106/275 |
| 4,321,153 | 3/1982 | Recchuite | 252/48.6 |
| 4,360,438 | 11/1982 | Rowan et al. | 252/33.6 |
| 4,387,167 | 6/1983 | Kidwell et al. | 501/140 |
| 4,456,540 | 6/1984 | Recchuite | 252/48.6 |
| 4,460,723 | 7/1984 | Rollman | 524/70 |
| 4,487,705 | 12/1984 | Recchuite | 252/46.6 |
| 4,502,972 | 3/1985 | Davis | 252/47 |

FOREIGN PATENT DOCUMENTS

| | | |
|---|---|---|
| 2128834 | 10/1972 | France . |
| 0630889 | 10/1949 | United Kingdom ............... 252/47.5 |
| 0680363 | 12/1949 | United Kingdom . |
| 0709293 | 9/1951 | United Kingdom . |
| 0676712 | 7/1952 | United Kingdom . |
| 1371949 | 10/1974 | United Kingdom . |

OTHER PUBLICATIONS

Chemical Abstract 92: 202563, (1980).
Ind. End. Chem. Prod. Res. Devlop., Januszke, 10, 209-14, (1971).
Chemical Review, 65, 237, (1965).
J. Am. Chem., Soc., 60, 2452, (1938).

Primary Examiner—William R. Dixon, Jr.
Assistant Examiner—Margaret B. Medley
Attorney, Agent, or Firm—Joseph P. Fischer; Denis A. Polyn; James L. Cordek

[57] ABSTRACT

Sulfur-containing compositions are described which are prepared by sulfurizing (A) at least one fatty acid ester of a polyhydric alcohol, or
(B) at least one fatty acid, fatty acid ester of a monohydric alcohol, or a mixture thereof, or
(C) at least one other olefin, or
(D) mixtures of any two or more of (A), (B) and (C), in the presence of a catalytic amount of
(E) at least one salt of at least one dithiocarbamic acid of the formula $$R_1(R_2)N\text{—CSSH}$$

wherein $R_1$ and $R_2$ are each independently hydrocarbyl groups, or
(F) at least one mercapto benzothiazole, or
(G) mixtures of (E) and (F).

Preferably, various mixtures of (A), (B) and (C) are sulfurized in accordance with the invention. The incorporation of a catalytic amount of salt of at least one dithiocarbamic acid of Formula I or at least one mercapto benzothiazole (or mixtures thereof) results in the preparation of sulfurized compositions which are characterized by excellent oil solubility and higher sulfur contents, and the compositions generally are lighter in color when compared to sulfurized compositions prepared in the absence of such catalysts. The sulfurized compositions prepared in accordance with the present invention are useful as general purpose antioxidants and friction modifiers for lubricating compositions and automatic transmission fluids and in particular, as additives in metal working lubricants. The above-described sulfurized compositions as well as sulfurized compositions prepared in the absence of catalysts (E) and/or (F) are useful in asphalt compositions.

127 Claims, No Drawings 4,740,322

SULFUR-CONTAINING COMPOSITIONS, AND ADDITIVE CONCENTRATES, LUBRICATING OILS, METAL WORKING LUBRICANTS AND ASPHALT COMPOSITIONS CONTAINING SAME

CROSS-REFERENCE TO RELATED APPLICATION

This application is a continuation-in-part application based on U.S. application Ser. No. 760,186, filed July 29, 1985 now abandoned. Benefit of the filing date of said earlier application is claimed for this application. The disclosure of said earlier application is incorporated herein by reference in its entirety.

TECHNICAL FIELD OF THE INVENTION

This invention relates to sulfur-containing compositions which are hydrocarbon-soluble or dispersible and which are useful as additives for lubricating oils for metal working lubricants and for asphalt compositions. More particularly, the invention relates to an improved method of sulfurizing fatty acid esters, fatty acids, other olefin compounds and mixtures thereof utilizing as a catalyst, salts of dithiocarbamic acids, mercapto benzothiazoles, and mixtures thereof.

BACKGROUND OF THE INVENTION

Various compositions prepared by the sulfurization of organic compounds and more particularly olefins and olefin-containing compounds are known in the art, as are lubricants containing these products. Typical sulfurized compositions prepared by reacting olefins such as isobutene, diisobutene, and triisobutene with sulfur under various conditions are described in, for example, *Chemical Review*, 65, 237 (1965). Other references describe the reaction of such olefins with hydrogen sulfide and elemental sulfur to form predominantly mercaptans with sulfides, disulfides and higher polysulfides also being formed as by-products. Reference is made to *J. Am. Chem. Soc.*, 60, 2452 (1938), and U.S. Pat. Nos. 3,221,056, 3,419,614 and 4,191,659. U.S. Pat. No. 3,419,614 describes a process for increasing the yield of mercaptan by carrying out the reaction of olefin with hydrogen sulfide and sulfur at a high temperature in the presence of various basic materials. U.S. Pat. No. 4,191,659 describes the preparation of sulfurized compositions by reaction at superatmospheric pressure of olefins with a mixture of sulfur and hydrogen sulfide in the presence of a catalyst followed by treatment with an alkali metal sulfide. The use of sulfurized natural and synthetic oils as additives in lubricating compositions has been suggested in the art such as in, for example, U.S. Pat. Nos. 2,299,813 and 4,360,438.

In the past, sulfurized sperm oil was used widely as an additive in many lubricant formulations such as in gear oil, worm, and spur gears, automatic transmission fluids, waxing lubricants, and as metal-working additives. Sulfurized sperm oil is especially useful for improving extreme pressure properties while providing excellent "slip" and some degree of rust-inhibition in motor oils, gear lubricants, and rolling oils. However, the sulfurized sperm oils have been replaced in recent years by other sulfurized compositions as a result of the reduction in availability of sperm oil and increased cost. Sulfurized olefins such as those described above do not always exhibit the degree of lubricity which is necessary in many applications.

Sulfurized fatty oils such as sulfurized lard oil have been described in the art, but sulfurized lard oil generally is not adequately soluble in paraffinic base oils to be useful. Several patents have issued in the last decade suggesting solutions to the solubility problems exhibited by sulfurized lard oil. A number of the prior art suggestions have involved sulfurizing mixtures of fatty oils such as lard oil and soybean oil and various olefinic compounds. For example, U.S. Pat. Nos. 3,953,347 and 3,926,822 describe compositions of matter useful as lubricant additives which are sulfurized compositions prepared by reacting sulfur with a mixture comprising at least one fatty acid ester, at least one aliphatic olefin containing about 8 to about 36 carbon atoms and optionally, at least one fatty acid. The sulfurized compositions are prepared by heating such mixtures of fatty acid ester and fatty acid olefin with sulfur at temperatures of from 65 to about 200° C. In addition to the above-described reagent, the reaction mixture may also include sulfurization promoters such as phosphorous-containing reagents such as phosphorous acid esters, and surface-active agents such as lecithin. An example of a phosphorous-acid ester given in these patents is triphenylphosphite.

U.S. Pat. No. 2,012,446 describes a method of sulfurizing pine oil which is reported as being useful as an additive for lubricant manufacture.

U.S. Pat. No. 4,188,300 describes a sulfurized product obtained by sulfurizing an olefin with a prime burning grade lard oil having a very low free acid content. These products are reported to exhibit improved solubility in paraffinic oils as compared to products obtained when an olefin is co-sulfurized with lard oil having a higher content of free acids such as winter-stained lard oil or extra winter-strained lard oil. Co-sulfurized products containing about 5 to 25% by weight of sulfur are obtained and are reported as being useful as metal-working oil additives. The preparation of various synthetic sulfurized oil of the reaction of sulfur, lard oil and polyisobutylene oligomers containing at least one pair of maximally crowded geminal methyl groups (e.g., tetraisobutylene) is described in U.S. Pat. No. 4,166,795. The preparation of synthetic sulfurized oil useful as the replacement for sulfurized sperm oil also is described in U.S. Pat. Nos. 3,843,534; 3,825,495; 4,166,795; 4,166,796; 4,166,797; 4,321,153; 4,456,540; and 4,487,705. The sulfurization generally is carried out using elemental sulfur, and simultaneous sulfurization and chlorination may be effected by reacting with sulfur monochloride. Phosphosulfurization is described in these patents and may be carried out by addition of small amounts of a phosphorus sulfide to the sulfurized blend followed by heating.

When preparing sulfurized compositions for use as lubricant additives, it generally is desirable to obtain products by the most inexpensive procedure utilizing inexpensive raw material. The color of the sulfurized compositions obtained should preferably be light, and the sulfur contained in the products should not be active sulfur.

The present invention also relates to metal working operations and more particularly to lubricants for use during such operations. In its broadest sense, it comprises a method for lubricating metal during working thereof and metal workpieces having on the surface thereof a film of a lubricant composition. Said composition comprises a major amount of a lubricating oil and a minor amount of at least one sulfurized composition prepared in accordance with this invention.

Metal working operations, for example, rolling, forging, hot-pressing, blanking, bending, stamping, drawing, cutting, punching, spinning and the like, generally employ a lubricant to facilitate the same. Lubricants greatly improve these operations in that they can reduce the power required for the operation, prevent sticking and decrease wear of dies, cutting tools and the like. In addition, they frequently provide rust-inhibiting properties to the metal being treated.

Many presently known metal working lubricants are oil-based lubricants containing a relatively large amount of active sulfur present in additives therein. (By "active sulfur" as used herein is meant chemically combined sulfur in a form which causes staining of copper.) The presence of active sulfur is sometimes detrimental because of its tendency to stain copper, as well as other metals including brass and aluminum. Nevertheless, its presence has frequently been necessary because of the beneficial extreme pressure properties of active sulfur-containing compositions, especially for the working of ferrous metals.

The use of sulfur in asphalts is known. Sulfur is generally added to the asphalt composition as elemental sulfur.

The asphalt compositions of this invention are particularly useful for pavements, roadways, driveways, parking lots and the like. The degree and rate of hardening of asphalt cement during application and while in service are factors affecting the durability of a surface such as a road pavement. A certain amount of hardening of a freshly applied surface is often desirable in order to allow the newly placed surface to be placed into service quickly. However, excessive hardening and loss of ductility of an asphalt based surface can dramatically reduce its useful lifetime. Januszke, in "Industrial Engineering Chemistry Product Research and Development", Volume 10, (1971), 209-213, indicates that lead and zinc diethyldithiocarbamates were effective in inhibiting the adverse hardening.

In certain geographic areas, such as desert regions in the western and southwestern United States, deterioration of an asphalt road may occur quickly and is often extensive. Embrittlement and cracking of the road surface often result.

It is known in the art that excessive hardening of paving asphalts can be reduced through the use of certain antioxidants such as lead or zinc dithiocarbamates. The above-mentioned reference by Januszke discusses an evaluation of the effect of 24 antioxidants on paving asphalt durability and is incorporated by reference for its teachings regarding the problem and methods of assessing the performance of additives.

It is also known in the art to incorporate sulfur and certain sulfur containing compounds as extenders for asphalt cement and to improve durability.

SUMMARY OF THE INVENTION

Sulfurized compositions are described which are prepared by reacting at an elevated temperature, a sulfurizing agent with (A) at least one fatty acid ester of a polyhydric alcohol, or (B) at least one fatty acid, a fatty acid ester of a monohydric alcohol, or a mixture thereof, or (C) at least one other olefin, or (D) a mixture of any two or more of (A), (B) and (C) in the presence of a catalytic amount of (E) at least one salt of at least one dithiocarbamic acid of the formula $$R_1(R_2)N-CSSH \qquad (I)$$

wherein $R_1$ and $R_2$ are each independently hydrocarbyl groups, or (F) at least one mercapto benzothiazole, or (G) mixtures of (E) and (F). More generally, the invention relates to sulfurized compositions prepared by reacting at an elevated temperature, a sulfurizing agent with a mixture of (A) about 100 parts by weight of at least one fatty acid ester of a polyhydric alcohol, (B) from about 0 to about 200 parts by weight of at least one fatty acid, fatty acid ester of a monohydric alcohol, or a mixture thereof, (C) from about 0 to about 400 parts by weight of at least one other olefin, and a catalytic amount of (E) at least one salt of at least one dithiocarbamic acid of the formula $$R_1(R_2)N-CSSH \qquad (I)$$

wherein $R_1$ and $R_2$ are each independently hydrocarbyl groups, or (F) at least one mercapto benzothioazole, or (G) mixtures of (E) and (F). The incorporation of the catalyst results in the preparation of sulfurized compositions which are characterized by higher sulfur contents, and the compositions are lighter in color and have less odor when compared to sulfurized compositions prepared in the absence of such catalysts. The sulfurized compositions prepared in accordance with the present invention are useful as general purpose antioxidants and friction modifiers for lubricating compositions, and as additives in metal working lubricants. Sulfurized compositions prepared with or without the aforementioned catalysts are useful as additives for asphalt compositions.

DETAILED DESCRIPTION OF THE PREFERRED EMBODIMENTS

Component (A) which is sulfurized in accordance with the present invention is at least one fatty acid ester of a polyhydric alcohol. The term "fatty acid" as used in the specification and claims refers to acids which may be obtained by the hydrolysis of a naturally occurring vegetable or animal fat or oil. These are usually in $C_{16-20}$ range and include palmitic acid, stearic acid, oleic acid, linoleic acid, etc.

The fatty acid esters which are useful as component (A) are the fatty acid esters of polyhydric alcohols. Examples of suitable polyhydric alcohols include ethylene glycol, propylene glycol, trimethylene glycol, neopentyl glycol, glycerol, etc. Fatty oils which are naturally occurring esters of glycerol with the above-noted long chain carboxylic acids, and synthetic esters of similar structure are useful. Usually preferred fatty acid esters in the process of the present invention are fatty oils derived from unsaturated acids, especially oleic and linoleic acids, including such naturally occurring animal fats and vegetable oils as tall oil, lard oil, peanut oil, cottonseed oil, soybean oil, sunflower oil, corn oil, etc. Specially grown sunflower oils containing high amounts of oleic acid (e.g., 80% by weight or more of oleic acid) can be sulfurized in accordance with the process of this invention. Such oils are available commercially under the general trade designation TRI-SUN ™ sunflower oil from SVO Enterprises Corporation, Wickliffe, Ohio.

Although various compositions prepared in accordance with the method of the invention utilizing only one type of fatty acid ester of a polyhydric alchol are soluble and useful as oil additives, the use of mixtures of fatty acid esters of polyhydric alcohols is preferred. In particular, mixtures of fatty acid esters of polyhydric alcohols containing at least about 50% by weight of lard oil, generally from about 50% to about 80% by weight of lard oil results in the formation of sulfurized compositions containing the desirably high amounts of sulfur and are relatively inexpensive. Moreover, such sulfurized materials prepared in accordance with the process of this invention are characterized by a reduction in undesirable color and odor. The examples of mixtures based on lard oil include, for example, a mixture of 50 parts by weight of lard oil and 50 parts by weight of soybean oil, a mixture containing 75 parts of lard oil and 25 parts of soybean oil, and a mixture comprising 60 parts of lard oil and 40 parts of peanut oil.

The compositions which can be sulfurized in accordance with the method of the present invention may be (B) at least one fatty acid or fatty acid ester of a monohydric alcohol, or mixtures thereof. Fatty acids of the type described above can be utilized, and the fatty acids generally utilized are unsaturated fatty acids such as oleic acid or linoleic acid. Mixtures of fatty acids such as obtained from tall oil or by the hydrolysis of peanut oil, soybean oil, sunflower oil, etc., also are useful. Esters of fatty acids obtained from monohydric alcohols containing up to about 20 carbon atoms can be utilized as component (B) either alone or in combination with fatty acids. Examples of monohydric alcohols useful in preparing the fatty acid esters include methanol, ethanol, n-propanol, isopropanol, the butanols, etc. Specific examples of fatty acid esters of monohydric alcohols useful as component (B) in the process of the invention include methyl oleate, ethyl oleate, lauryl oleate, methyl linoleate, oleyl stearate, cetyl linoleate, etc.

The compositions which can be sulfurized in accordance with this invention may be other olefinic compounds (C) such as, for example: aliphatic arylaliphatic or alicyclic olefinic hydrocarbons containing at least three carbon atoms; Diels-Alder adducts of at least one dienophile with at least one aliphatic conjugated aliphatic diene; and at least one terpene compound. The olefinic compounds contain at least one terpene compound. The olefinic compounds contain at least one olefinic double bond which is defined as a non-aromatic double bond. That is, the double bond connects two aliphatic carbon atoms.

In one embodiment, the olefin utilized as component (C) may be defined by the formula $$R^1R^2C=CR^3R^4 \qquad (II)$$

wherein each of $R^1$, $R^2$, $R^3$ and $R^4$ is hydrogen or an organic group, with the proviso that at least one R group must be an organic group. In general, that R values in the above formula may be satisfied by such groups as $-R^5$, $-C(R^5)_3$, $-COOR^5$, $-CON(R^5)_2$, $-COOM$, $-CN$, $-COON(R^5)_4$,

$-X$, $-R^5X$, $-YR^5$, $-R^5YR^5$, $-R^5N(R^5)_2$ or $-Ar$, wherein each $R^5$ is independently hydrogen, alkyl, alkenyl, aryl, alkylaryl, substituted alkyl or substituted alkenyl, with the proviso that any two $R^5$ groups can be alkylene or substituted alkylene whereby a ring of up to about 12 carbon atoms if formed;

Ar is an aryl or substituted aryl group of up to about 12 carbon atoms in the substituent;

M is one equivalent of a metal cation (preferably Group I or II, e.g., sodium, potassium, barium, calcium);

X is halogen (e.g., chloro, bromo, or iodo); and

Y is oxygen or divalent sulfur.

Any two of $R^1$, $R^2$, $R^3$ and $R^4$ may also together form any alkylene or substituted alkylene group; i.e., the olefinic compound may be alicyclic.

The nature of the substituents in the substituted moieties described above is not normally a critical aspect of the invention and any such substituent is useful so long as it is or can be made compatible with lubricating environments or asphalt compositions and does not interfere under the contemplated reaction conditions. Thus, substituted compounds which are so unstable as to deleteriously decompose under the reaction conditions employed are not contemplated. However, certain substituents such as keto or aldehydo can desirably undergo sulfurization. The selection of suitable substituents is within the skill of the art or may be established through routine testing. Typical of such substituents include any of the above listed moieties as well as hydroxy, carboxy, carbalkoxy, amidine, amino, sulfonyl, sulfinyl, sulfonate, nitro, phosphate, phosphite, alkali metal mercapto and the like.

The olefinic compound is usually one in which each R group which is not hydrogen is independently alkyl or alkenyl, or (less often) a corresponding substituted group. Monoolefinic and diolefinic compounds, particularly the former, are preferred, and especially terminal monoolefinic hydrocarbons; that is, those compounds in which $R^3$ and $R^4$ are hydrogen and $R^1$ and $R^2$ are alkyl (that is, the olefin is aliphatic). Olefinic compounds having at least about 3 carbon atoms, and especially about 3 to about 36 carbon atoms are desirable. Olefins containing from about 8 to 24 carbon atoms are particularly useful.

The olefinic compound also can be an arylaliphatic compound, particularly wherein the aryl group is a phenyl or substituted phenyl group. Specific examples include styrene, alpha-methyl styrene, vinyl toluene, 4-ethyl vinyl benzene, etc.

Propylene, isobutene and their dimers, trimers, tetramers and oligomers, and mixtures thereof are useful olefinic compounds. Examples of useful olefins include isobutene, 1-butene, 1-hexene, 1-octene, diisobutene, cyclohexene, triisobutene, commercially available higher aliphatic alpha-olefins, especially those in the $C_{12-30}$ range, such as 1-hexadecene and 1-octadecene, and commercial mixtures thereof such as $C_{15-20}$ alpha-olefins, $C_{16}$ alpha-olefins, $C_{15-18}$ alpha-olefins, $C_{22-28}$ alpha-olefins, etc.

Polymers of olefins such as, for example, isobutene also are useful so long as they and their sulfurized derivatives are compatible with the other components, and the sulfurized product does not lose its desirable properties. Polybutenes having number average molecular weights of up to about 1000 or 1500 are examples of useful polyolefins.

Generally, the olefinic component (C) is at least one aliphatic, aryl aliphatic, or alicyclic olefinic compound containing at least about 3 carbon atoms. Such olefinic compounds containing from about 3 to about 36 carbon atoms and more preferably from about 8 to about 24 carbon atoms are particularly useful. It is common to use mixtures of such olefins as component (C) since these mixtures are available commercially.

The olefinic compound can also be an internal olefin. The internal olefins may be represented by the following general formula

$$CH_3(CH_2)_nCH=CH-(CH_2)_mCH_3 \qquad (III)$$

wherein n and m are independently integers from 0 to about 15 and the total number of carbon atoms is at least 8. Examples of internal olefins useful in this invention include 2-octene, 2-dodecene, 4-dodecene, 9-octadecene, 7-tetradecene, 7-hexadecene and 11-eicodecene. Mixtures of two or more olefins including mixtures of alpha- and internal olefins are useful. One method for preparing such mixtures of olefins is by the isomerization of commercially available alpha-olefins, and the product of the isomerization reaction is a mixture of olefins wherein the double bond is in the 1,2,3,4, etc. position. Alternatively, the mixtures of olefins may be obtained by fractionation or by blending of olefins of various types and molecular weights. The isomerization of terminal olefins is effected by heating the olefin with mildly acidic catalysts such as Amberlyst 15. Alpha-olefins, and particularly those containing about 10 to about 20 carbon atoms are preferred. Mixtures of such olefins are commercially available and are particularly desirable for use in the present invention.

In another embodiment, the olefin (C) is a Diels-Alder adduct. The Diels-Alder adducts are a well-known, art-recognized class of compounds prepared by the diene synthesis or Diels-Alder Reaction. A summary of the prior art relating to this class of compounds is found in the Russian monograph, *Dienovyi Sintes,* Izdatelstwo Akademii Nauk SSSR, 1963 by A. S. Onischenko. (Translated into the English language by L. Mandel as A. S. Onischenko, *Diene Synthesis,* N.Y., Daniel Davey and Co., Inc., 1964.) This monograph and references cited therein are incorporated by reference into the present specification. The preparation of a number of Diels-Alder adducts useful in the present invention is described in U.S. Reissue Pat. No. 27,331, the disclosure of which is hereby incorporated by reference.

Basically, the diene synthesis (Diels-Alder reaction) involves the reaction of at least one conjugated diene, C=C—C=C, with at least one ethylenically or acetylenically unsaturated compound, C=C or —C≡C—, these later compounds being known as dienophiles. The reaction can be represented as follows:

Reaction 1:

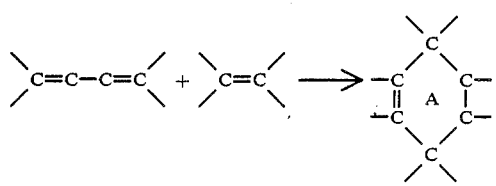

Reaction 2:

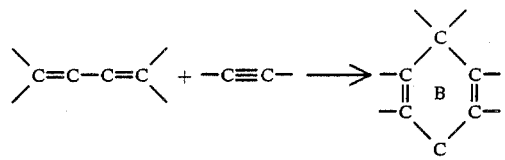

The products, A and B are commonly referred to as Diels-Alder adducts. It is these adducts which are used as starting materials for the preparation of the sulfurized Diels-Alder adducts utilized in the invention.

Representative examples of such 1,3-dienes include aliphatic conjugated diolefins or dienes of the formula

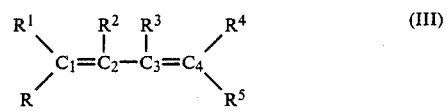

wherein R through $R^5$ are each independently selected from the group consisting of alkyl, halo, alkoxy, alkenyl, alkenyloxy, carboxy, cyano, amino, alkylamino, dialkylamino, phenyl, and phenyl-substituted with 1 to 3 substituents corresponding to R through $R^5$ with the proviso that a pair of R's on adjacent carbons do not form an additional double bond in the diene. Preferably not more than three of the R variables are other than hydrogen and at least one is hydrogen. Normally, the total carbon content of the diene will not exceed 20. In one preferred aspect of the invention, adducts are used where $R^2$ and $R^3$ are both hydrogen and at least one of the remaining R variables is also hydrogen. Preferably, the carbon content of these R variables when other than hydrogen is 7 or less. In this most preferred class, those dienes where R, $R^1$, $R^4$, and $R^5$ are hydrogen, chloro, or lower alkyl are especially useful. Specific examples of the R variables include the following groups: methyl, ethyl, phenyl, HOOC—, N≡C—, $CH_3O$—, $CH_3COO$—, $CH_3CH_2O$—, $CH_3C(O)$—, HC(O)—, Cl, Br, tert-butyl, $CF_3$, tolyl, etc. Piperylene, isoprene, methylisoprene, chloroprene, and 1,3-butadiene are among the preferred dienes for use in preparing the Diels-Alder adducts.

In addition to these linear 1,3-conjugated dienes, cyclic dienes are also useful as reactants in the formation of the Diels-Alder adducts. Examples of these cyclic dienes are the cyclopentadienes, fulvenes, 1,3-cyclohexadienes, 1,3-cycloheptadienes, 1,3,5-cycloheptatrienes, cyclooctatetraene, and 1,3,5-cyclononatrienes. Various substituted derivatives of these compounds enter into the diene synthesis.

The dienophiles suitable for reacting with the above dienes to form the adducts used as reactants can be represented by the formula

wherein the K variables are the same as the R variables in Formula III above with the proviso that a pair of K's may form an additional carbon-to-carbon bond, i.e., K—C≡C—$K_2$, but do not necessarily do so.

A preferred class of dienophiles are those wherein at least one of the K variables is selected from the class of electron-accepting groups such as formyl, cyano, nitro, carboxy, carbonhydrocarbyloxy, hydrocarbylcarbonyl, hydrocarbylsulfonyl, carbamyl, acrylcarbamyl, N-acyl-N-hydrocarbylcarbamyl, N-hydrocarbylcarbamyl, and N,N-dihydrocarbylcarbamyl. Those K variables which are not electron-accepting groups are hydrogen, hydrocarbyl, or substituted-hydrocarbyl groups. Usually the hydrocarbyl and substituted hydrocarbyl groups will not contain more than 10 carbon atoms each.

The hydrocarbyl groups present as N-hydrocarbyl substituents are preferably alkyl of 1 to 30 carbons and especially 1 to 10 carbons. Representative of this class of dienophiles are the following: nitroalkenes, e.g., 1-nitrobutene-1, 1-nitropentene-1, 3-methyl-1-nitrobutene-1, 1-nitroheptene-1, 1-nitrooctene-1, 4-ethoxy-1-nitrobutene-1; alpha, betaethylenically unsaturated aliphatic carboxylic acid esters, e.g., alkylacrylates and alpha-methyl alkylacrylates (i.e., alkyl methacrylates) such as butylacrylate and butylmethacrylate, decyl acrylate and decylmethacrylate, di-(n-butyl)-maleate, di-(t-butyl-maleate); acrylonitrile, methacrylonitrile, beta-nitrostyrene, methylvinylsulfone, acrolein, acrylic acid; alpha, beta-ethylenically unsaturated aliphatic carboxylic acid amides, e.g., acrylamide, N,N-dibutylacrylamide, methacrylamide, N-dodecylmethacrylamide, N-pentylcrotonamide; crotonaldehyde, crotonic acid, beta, beta-dimethyldivinylketone, methyl-vinylketone, N-vinyl pyrolidone, alkenyl halides, and the like.

One preferred class of dienophiles are those wherein at least one, but not more than two of K variables is $-C(O)O-R_o$ where $R_o$ is the residue of a saturated aliphatic alcohol of up to about 40 carbon atoms; e.g., for example, at least one K is carbohydrocarbyloxy such as carboethoxy, carbobutoxy, etc., the aliphatic alcohol from which $-R_o$ is derived can be a mono or polyhydric alcohol such as alkyleneglycols, alkanols, aminoalkanols, alkoxy-substituted alkanols, ethanol, ethoxy ethanol, propanol, beta-diethylaminoethanol, dodecyl alcohol, diethylene glycol, tripropylene glycol, tetrabutylene glycol, hexanol, octanol, isooctyl alcohol, and the like. In this especially preferred class of dienophiles, not more than two K variables will be $-C(O)-O-R_o$ groups and the remaining K variables will be hydrogen or lower alkyl, e.g., methyl, ethyl, propyl, isopropyl, and the like.

Specific examples of dienophiles of the type discussed above are those wherein at least one of the K variables is one of the following groups: hydrogen, methyl, ethyl, phenyl, HOOC—, HC(O)—, CH₂=CH—, HC≡C—, CH₃C(O)O—, ClCH₂—, HOCH₂—, alpha-pyridyl, —NO₂, Cl, Br, propyl, isobutyl, etc.

In addition to the ethylenically unsaturated dienophiles, there are many useful acetylenically unsaturated dienophiles such as propiolaldehyde, methylethynylketone, propylethynylketone, propenylethynylketone, propiolic acid, propiolic acid nitrile, ethylpropiolate, tetrolic acid, propargylaldehyde, acetylenedicarboxylic acid, the dimethyl ester of acetylenedicarboxylic acid, dibenzoylacetylene, and the like.

Cyclic dienophiles include cyclopentenedione, coumarin, 3-cyanocoumarin, dimethyl maleic anhydride, 3,6-endomethylene-cyclohexenedicarboxylic acid, etc. With the exception of the unsaturated dicarboxylic anhydrides derived from linear dicarboxylic acids (e.g., maleic anhydride, methylmaleic anhydride, chloromaleic anhydride), this class of cyclic dienophiles ar limited in commercial usfulness due to their limited availability and other economic considerations.

The reaction products of these dienes and dienophiles correspond to the general formulae

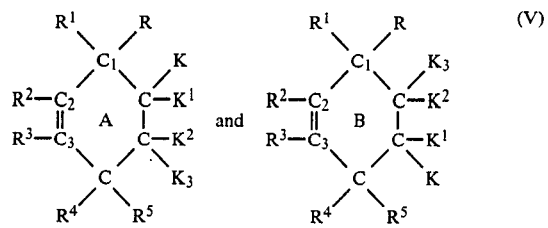

wherein R through $R^5$ and K through $K_3$ are as defined hereinbefore. If the dienophile moiety entering into the reaction is acetylenic rather than ethylenic, two of the K variables, one from each carbon, form another carbon-to-carbon double bond. Where the diene and/or the dienophile is itself cyclic, the adduct obviously will be bicyclic, tricyclic, fused, etc., as exemplified below:

Reaction 3:

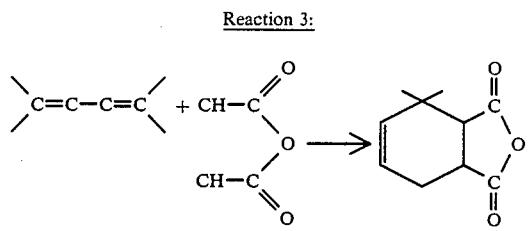

Reaction 4:

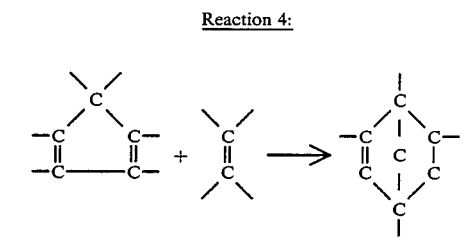

Normally, the adducts involve the reaction of eqimolar amounts of diene and dienophile. However, if the dienophile has more than one ethylenic linkage, it is possible for additional diene to react if present in the reaction mixture.

The adducts and processes of preparing the adducts are further exemplified by the following examples. Unless otherwise indicated in these examples and in other parts of this specification, as well as in the appended claims, all parts and percentages are by weight.

EXAMPLE DA-1

A mixture comprising 400 parts of toluene and 66.7 parts of aluminum chloride is charged to a two-liter flask fitted with a stirrer, nitrogen inlet tube, and a solid carbon dioxide-cooled reflux condenser. A second mixture comprising 640 parts (5 moles) of butyl acrylate and 240.8 parts of toluene is added to the AlCl₃ slurry while maintaining the temperature within the range of 37°–58° C. over a 0.25-hour period. Thereafter, 313 parts (5.8 moles) of butadiene is added to the slurry over a 2.75-hour period while maintaining the temperature of the reaction mass at 50°–61° C. by means of external cooling. The reaction mass is blown with nitrogen for about 0.33 hour and then transferred to a four-liter separatory funnel and washed with a solution of 150 parts of concentrated hydrochloric acid in 1100 parts of water. Thereafter, the product is subjected to two additional water washings using 1000 parts of water for each wash. The washed reaction product is subsequently distilled to remove unreacted butyl acrylate and toluene. The residue of this first distillation step is subjected to further distillation at a pressure of 9–10 millimeters of mercury whereupon 785 parts of the desired product is collected over the temperature of 105°–115° C.

EXAMPLE DA-2

The adduct of isoprene and acrylonitrile is prepared by mixing 136 parts of isoprene, 106 parts of acrylonitrile, and 0.5 parts of hydroquinone (polymerization inhibitor) in a rocking autoclave and thereafter heating for 16 hours at a temperature within the range of 130°–140° C. The autoclave is vented and the contents decanted thereby producing 240 parts of a light yellow liquid. This liquid is stripped at a temperature of 90° C. and a pressure of 10 millimeters of mercury thereby yielding the desired liquid product as the residue.

EXAMPLE DA-3

Using the procedure of Example DA-2, 136 parts of isoprene, 172 parts of methyl acrylate, and 0.9 part of hydroquinone are converted to the isoprene-methyl acrylate adduct.

EXAMPLE DA-4

Following the procedure of Example DA-2, 104 parts of liquified butadiene, 166 parts of methyl acrylate, and 1 part of hydroquinone are charged to the rocking autoclave and heated to 130°–135° C. for 14 hours. The product is subsequently decanted and stripped yielding 237 parts of the adduct.

EXAMPLE DA-5

One-hundred thirty-nine parts (1 mole) of the adduct of butadiene and methyl acrylate is transesterified with 158 parts (1 mole) of decyl alcohol. The reactants are added to a reaction flask and 3 parts of sodium methoxide are added. Thereafter, the reaction mixture is heated at a temperature of 190°–200° C. for a period of 7 hours. The reaction mass is washed with a 10% sodium hydroxide solution and the 250 parts of naphtha is added. The naphtha solution is washed with water. At the completion of the washing, 150 parts of toluene are added and the reaction mass is stripped at 150° C. under pressure of 28 parts of mercury. A dark-brown fluid product (225 parts) is recovered. This product is fractionated under reduced pressure resulting in the recovery of 178 parts of the product boiling in the range of 130°–133° C. at a pressure of 0.45 to 0.6 millimeters of mercury.

EXAMPLE DA-6

The general procedure of Example DA-1 is repeated except that only 270 parts (5 moles) of butadiene is included in the reaction mixture.

As mentioned before, the other olefin compound (C) may be at least one terpene compound.

The term "terpene compound" as used in the specification and claims is intended to include the various isomeric terpene hydrocarbons having the empirical formula $C_{10}H_{16}$, such as contained in turpentine, pine oil and dipentenes, and the various synthetic and naturally occuring oxygen-containing derivatives. Mixtures of these various compounds generally will be utilized, especially when natural products such as pine oil and turpentine are used. Pine oil, for example, which is obtained by destructive distillation of waste pine wood with superheated steam comprises a mixture of terpene derivatives such as alpha-terpineol, beta-terpineol, alpha-fenchol, camphor, borneol/isoborneol, fenchone, estragole, dihydro alpha-terpineol, anethole, and other mono-terpene hydrocarbons. The specific ratios and amounts of the various components in a given pine oil will depend upon the particular source and the degree of purification. A group of pine oil-derived products are avilable commercially from Hercules Incorporated. It has been found that the pine oil products generally known as terpene alcohols available from Hercules Incorporated are particularly useful in the preparation of the sulfurized products of the invention. Examples of such products include alpha-Terpineol containing about 95–97% of alpha-terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60–65 weight percent of alpha-terpineol and 15–20% beta-terpineol, and 18–20% of other tertiary terpene alcohols. Other mixtures and grades of useful pine oil products also are available from Hercules under such designations as Yarmor 302, Herco pine oil, Yarmor 302W, Yarmor F and Yarmor 60.

The terpene compounds which can be utilized in the preparation of the sulfurized compositions of the present invention also may be sulfurized terpene compounds, sulfurized mixtures of terpene compounds or mixtures of at least one terpene compound and at least one sulfurized terpene compound. Sulfurized terpene compounds can be prepared by sulfurizing terpene compounds with sulfur, sulfur halides, or mixtures of sulfur or sulfur-dioxide with hydrogen sulfide as will be described more fully hereinafter. Also, the sulfurization of various terpene compounds has been described in the prior art. For example, the sulfurization of pine oil is described in U.S. Pat. No. 2,012,446.

The compositions which can be sulfurized in accordance with this invention may be (D) a mixture of two or more of (A), (B) and (C) described above. Thus, a mixture of (A) at least one fatty acid ester and (C) at least one olefin may be sulfurized by the process of this invention. Other combinations include the following: (A) and (B); (B) and (C); and (A), (B) and (C).

In one preferred embodiment, the sulfurized compositions of the invention are prepared by reacting at an elevated temperature a sulfurizing agent with a mixture comprising (A) about 100 parts by weight of at least one fatty acid ester of a polyhydric alcohol, (B) from about 0 to about 200 parts by weight of at least one fatty acid, fatty acid ester of a monohydric alcohol, or a mixture thereof, (C) from about 0 to about 400 parts by weight of at least one other olefin in the presence of (E) at least one salt of at least one dithiocarbamic acid of the formula $$R_1(R_2)N-CSSH \qquad (I)$$

wherein $R_1$ and $R_2$ are each independently hydrocarbyl groups, or (F) at least one mercapto benzothiazole, or (G) mixtures of (E) and (F). Preferably these mixtures will contain at least about two parts of the fatty acid or fatty acid ester (B). A preferred range is from about 2 to about 100 parts of (B) per 100 parts of (A). Other preferred mixtures contain at least about 25 parts of the aliphatic olefin (C). A particularly useful range of (C) is from about 25 to about 100 parts of (C) per 100 parts of (A). In another preferred embodiment, the mixture which is sulfurized will contain all three components (A), (B) and (C).

The sulfurization reactions of the present invention are carried out in the presence of a catalytic amount of (E) at least one salt of at least one dithiocarbamic acid of the formula $$R_1(R_2)N-CSSH \qquad (I)$$

wherein $R_1$ and $R_2$ are each independently hydrocarbyl groups. The hydrocarbyl groups $R_1$ and $R_2$ may be alkyl groups, cycloalkyl groups, aryl groups, alkaryl groups of aralkyl groups. $R_1$ and $R_2$, taken together, may represent the gorup consisting of polymethylene and alkyl-substituted polymethylene groups thereby forming a cyclic compound with the nitrogen. Generally, the alkyl group will contain from about 1 to about 20 carbon atoms and more generally from about 2 to about 10 carbon atoms. The salts may be metal, ammonia or amine type salts.

The metal of the metal salt may be a monovalent metal or a polyvalent metal, although polyvalent metals are preferred because they are generally more oil-soluble then alkali metal salts. Suitable polyvalent metals include, for example, the alkaline earth metals, zinc, cadmium, magnesium, tin, molybdenum, iron, copper, nickel, cobalt, chromium, lead, etc. The Group II metals are preferred.

The ammonium and amine salts may be characterized by the general formula $$R_1(R_2)NCSS^\ominus N^\oplus(H)R_5R_4R_3 \qquad (VI)$$

wherein $R_1$ and $R_2$ are as defined in Formula I, and $R_3$, $R_4$ and $R_5$ are each independently hydrogen or hydrocarbyl groups such as $R_1$ and $R_2$. Such salts can be prepared by methods known in the art. For example, the preformed dithiocarbamic acid can be treated with ammonia or a substituted amine $R_3R_4R_5N$. Specific examples of such salts include dimethylcyclohexylammonium dibutylthiocarbamate and piperidinium pentamethylenedithiocarbamate. Alternatively, the salts can be prepared directly from the reaction of an excess of an amine, (e.g., $R_1R_2NH$) with carbon disulfide as illustrated in the following reaction:

$$2R_1R_2NH+CS_2R_1(R_2)N-CSS^\ominus N^\oplus(H)_2(R_2)R_1$$

In such instances, the two $R_1$ groups in the salt are identical and the two $R_2$ groups in the product also are identical.

Mixtures of metal salts, amine salts, and metal and amine salts of dithiocarbamic acids also are contemplated as being useful in the present invention. Such mixtures can be prepared by first preparing mixtures of dithiocarbamic acids and thereafter converting said acid mixtures to salts, or alternatively, the salts of various dithiocarbamic acids can be prepared and thereafter mixed to given the desired product. Thus, the mixtures which can be incorporated in the compositions of the invention may be merely the physical mixture of the different dithiocarbamic salts or different dithiocarbamate groupings attached to the same polyvalent metal atom.

Examples of alkyl groups are ethyl, propyl, butyl, amyl, hexyl, heptyl, octyl, decyl, dodecyl, tridecyl, pentadecyl and hexadecyl groups including isomeric forms thereof. Examples of cycloalkyl groups include cyclohexyl and cycloheptyl groups, and examples of aralkyl groups include benzyl and phenylethyl. Examples of polymethylene groups include penta- and hexamethylene groups, and examples of alkyl-substituted polymethylene groups include methyl pentamethylene, dimethyl pentamethylene, etc.

Specific examples of the metal dithiocarbamates useful as component (E) in the compositions of this invention include bismuth dimethyldithiocarbamate, calcium diethyldithiocarbamate, calcium diamyldithiocarbamate, cadmium diethyldithiocarbamate, copper dimethyldithiocarbamate, zinc diethyldithiocarbamate, zinc dibenzyldithiocarbamate, zinc dibutyldithiocarbamate, zinc diamyldithiocarbamate, zinc di(2-ethyl-hexyl)dithiocarbamate, cadmium dibutyldithiocarbamate, cadmium dioctyldithiocarbamate, cadmium octyl-butyldithiocarbamate, magnesium dibutyldithiocarbamate, magnesium dioctyldithiocarbamate, cadmium dicetyldithiocarbamate, sodium diamyldithiocarbamate, sodium diisopropyldithiocarbamate, etc.

The various metal salts of dithiocarbamic acids utilized in the compositions of this invention are well known in the art and can be prepared by known techniques.

The catalyst for the sulfurization reaction also can be (F) at least one mercapto benzothiazole which may be mercapto benzothiazole itself or derivatives such as metal salts. The metal of the metal salts may be any of the metals described above with respect to the metal salts of the dithiocarbamic acids (E). The metal salts are known in the art, and the Group II metal salts are known in the art, and the Group II metal salts are preferred as catalysts in the sulfurization process of this invention.

Mixtures of the salts of the dithiocarbamic acids and salts of mercapto benzothiazole can be utilized as the catalysts. It is generally preferred, however, to utilize the dithiocarbamate salts alone.

The amount of catalyst (E), (F) or (G) used in the reaction is an amount sufficient to catalyze the sulfurization reaction. Generally amounts of from about 0.0001 to about 5% by weight of the catalyst based on the combined weight of (A), (B) and (C) are sufficient.

The sulfurization reaction generally is effected at an elevated temperature of from about 50° to about 350° C., more preferably, at a temperature of from about 50° to about 200° C. The reaction is effected with efficient agitation and usually in an inert atmosphere such as nitrogen. If any of the reagents are appreciably volatile at the reaction temperature, the reaction vessel may be sealed and maintained under pressure. Although generally not necessary, the reaction may be effected in the presence of an inert solvent such as an alcohol, ether, ester, aliphatic hydrocarbon, halogenated aromatic hydrocarbon, etc., which is a liquid within the temperature range employed for the reaction.

The sulfurizing agents useful in the process of the present invention include elemental sulfur, hydrogen sulfide, sulfur halide, sodium sulfide and a mixture of hydrogen sulfide and sulfur or sulfur dioxide, etc. Preferably, the sulfurizing agent is elemental sulfur. It is frequently advantageous to add the sulfurizing agent portionwise to the mixture of the other reagents. When elemental sulfur is utilized as a sulfurizing agent, the reaction is in some instances exothermic which can be utilized as a cost-cutting benefit. The amount of sulfur or sulfurizing agent added to the reaction mixture can be varied over a wide range although the amount included in the reaction mixture should be an amount sufficient to provide a sulfurized product containing the desired amount of sulfur which generally is at least about 10% by weight.

Following the sulfurization reaction, it is preferred to remove substantially all low boiling materials, typically by venting the reaction vessel, by sparging with an inert gas such as nitrogen, by vacuum distillation or stripping, etc. Insoluble by-products may be removed by filtration if necessary, usually at an elevated temperature (about 80°–120° C.).

A further optional step in the preparation of the sulfurized compositions is the treatment of the sulfurized product obtained as described above to reduce any active sulfur which may be present. An illustrative method is the treatment with an alkali metal sulfide. Other optional treatments may be employed to improve product quality such as odor, color, and staining characteristics of the sulfurized compositions.

The following examples illustrate the preparation of the sulfurized composition of the present invention. Unless otherwise indicated in the examples and elsewhere in the specification and claims, all parts and percentages are by weight, and temperatures are in degrees centigrade.

EXAMPLE 1

A mixture of 1000 parts of commercial $C_{15-18}$ alpha-olefins, 137 parts of sulfur and 10 parts of zinc diamyldithiocarbamate is prepared and heated to a temperature of 150° C. The mixture is maintained at this temperature for a total of about 15 hours and filtered through a filter aid. The filtrate is the desired sulfurized composition containing 12.69% sulfur (theory, 11.94).

EXAMPLE 2

A mixture of 900 parts of commercial $C_{15-18}$ alpha-olefins, 100 parts of pine oil, 141 parts of sulfur and 10 parts of zinc diamyldithiocarbamate is prepared and heated to 130° C. The mixture is maintained at this temperature with stirring for a total of about 12 hours and filtered through a filter aid. The filtrate is the desired product containing 12.61% sulfur (theory, 12.25).

EXAMPLE 3

A mixture of 561 parts of 1-octene, 160 parts of sulfur and 10 parts of zinc diamyldithiocarbamate is prepared and heated to a temperature of about 130° C. The mixture is maintained at this temperature for about 6 hours and filtered. The filtrate is the desired product containing 23.2% sulfur (theory, 22.22).

EXAMPLE 4

The product of Example 3 (500 parts) is stripped by heating to 100° C. and thereafter 130° C. under vacuum. The residue (367 parts) is the desired product containing 30.31% sulfur.

EXAMPLE 5

A mixture of 1052 parts of 1-decane, 360 parts of sulfur and 15 parts of zinc diamyldithiocarbamate is prepared and heated to a temperature of 130° C. The mixture is maintained at this temperature with stirring for a total of 9 hours and thereafter at a temperature of 150° C. for 6 hours. The temperature then is lowered to 100° C. and filtered. The filtrate is the desired product containing 25.8% sulfur (theory, 25.48).

EXAMPLE 6

A mixture of 1052 parts of isomerized 1-decane (isomerized by treatment with Amberlyst 15), 360 parts of sulfur and 15 parts of zinc diamyldithiocarbamate is prepared and heated to 130° C. The mixture is maintained at this temperature fo 9 hours and thereafter at 150° C. for 6 hours. The mixture is cooled to 90° C. and filtered. The filtrate is the desired product containing 25.6% sulfur (theory, 25.5).

EXAMPLE 7

A mixture of 1000 parts of a commercial $C_{16-18}$ alpha-olefin, 137 parts of sulfur and 10 parts of zinc diamyldithiocarbamate is prepared, purged with nitrogen and heated to 130° C. The mixture is maintained at 130° C. for 6 hours, cooled to 100° C. and filtered. The filtrate is the desired product containing 11.85% sulfur (theory, 12.15).

EXAMPLE 8

A mixture of 700 parts of commercial $C_{16-18}$ alpha-olefin, 164.7 parts of sulfur and 7 parts of zinc diamyldithiocarbamate is prepared, purged with nitrogen and heated to 130° C. The mixture is maintained at this temperature for about 12 hours thereafter at a temperature for 150° C. for 6 hours. The mixture is cooled to 100° C. and filtered. The filtrate is the desired product containing 18.9% sulfur (theory, 19.08).

EXAMPLE 9

A mixture of 1000 parts of a commercial $C_{16-18}$ alpha-olefin, 235.2 parts of sulfur and 10 parts of zinc diamyldithiocarbamate is prepared, purged with nitrogen and heated to 130° C. The mixture is maintained at this temperature for about 12 hours, at 150° C. for 6 hours, and finally at a temperature of 180° C. for 3 hours. After cooling to 100° C., the mixture is filtered, and the filtrate is the desired product containing 17.4% sulfur (theory, 19.08).

EXAMPLE 10

A mixture of 100 parts of commercial $C_{16-18}$ alpha-olefin, 255.4 parts of sulfur and 10 parts of zinc diamyldithiocarbamate is prepared, purged with nitrogen and heated to 130° C. The mixture is maintained at this temperature for a total of about 12 hours and thereafter at 150° C. for about 3 hours. After cooling to 100° C., the mixture is filtered, and the filtrate is the desired product containing 20.66% sulfur (theory, 20.37).

EXAMPLE 11

A mixture of 663.8 parts of soybean oil, 301.4 parts of commercial $C_{15-18}$ alpha-olefin, 34.8 parts of oleic acid, 118 parts of sulfur and 10 parts of zinc diamyldithiocarbamate is prepared, purged with nitrogen and heated to 130° C. The mixture is maintained at this temperature for a total of about 9 hours and filtered. The filtrate is the desired product containing 10.1% sulfur (theory, 10.68).

EXAMPLE 12

The procedure of Example 11 is repeated except that 124.2 parts of sulfur is included in the mixture. The product obtained in this manner contains 18.0% sulfur (theory, 18.26).

EXAMPLE 13

A mixture of 1056 parts of soybean oil, 124.6 parts of sulfur and 10.6 parts of zinc diamyldithiocarbamate is prepared, purged with nitrogen and heated to 130° C. The mixture is maintained at this temperature for about 9 hours, cooled to 100° C. and filtered. The filtrate is the desired product containing 10.2% sulfur (theory, 10.68).

EXAMPLE 14

A mixture of 1000 parts of sunflower oil, 118 parts of sulfur and 10 parts of zinc diamyldithiocarbamate is prepared, purged with nitrogen and heated to 130° C. The mixture is maintained at this temperature for about 12 hours and at a temperature of 150° C. for 3 hours. After cooling to about 110° C., the mixture is filtered, and the filtrate is the desired product containing 9.91% sulfur (theory, 10.68).

EXAMPLE 15

A mixture of 900 grams of the Diels-Alder adduct of Example DA-6, 149 parts of sulfur and 9 parts of zinc diamyldithiocarbamate is prepared, purged with nitrogen and heated to a temperature of about 130° C. The mixture is maintained at this temperature for about 6 hours. After cooling to about 95° C., the mixture is filtered. The filtrate is the desired product containing 11.81% sulfur (theory, 13.95).

EXAMPLE 16

The general procedure of Example 15 is repeated except that the mixture contains 320 parts of sulfur. The product obtained in this manner contains 22.6% sulfur (theory, 26).

EXAMPLE 17

A mixture of 1000 parts of a commercial $C_{16-18}$ alpha-olefin, 225.4 parts of sulfur and 14.7 parts of the amine salt of diamyldithiocarbamic acid prepared by the reaction of two moles of diamylamine with one mole of carbon disulfide is prepared, purged with nitrogen and heated to 130° C. The mixture is maintained at this temperature for a total of 12 hours and at a temperature of 150° C. for an additional 6 hours. After cooling to 100° C., the mixture is filtered, and the filtrate is the desired product containing 20.1% sulfur (theory, 20.30).

EXAMPLE 18

A mixture of 1000 parts of commercial $C_{16-18}$ alpha-olefin, 255.4 parts of sulfur and 8.9 parts of copper (II) dibutyldithiocarbamate is prepared, purged with nitrogen and heated to 130° C. The mixture is maintained at this temperature for a total of 12 hours and at a temperature of 150° C. for an additional 6 hours. After cooling to about 100° C., the mixture is filtered, and the filtrate is the desired product containing 20.5% sulfur (theory, 20.4).

EXAMPLE 19

A mixture of 1000 parts of commercial $C_{15-18}$ alpha-olefin, 137 parts of sulfur, 10 parts of 2-mercaptobenzothiazole and 10 parts of zinc oxide is prepared and heated to 130° C. The mixture is maintained at this temperature for 6 hours, and at a temperature of 150° C. for an additional 6 hours. After cooling, the mixture is filtered, and the filtrate is the desired product containing 11.26% sulfur (theory, 11.94).

The sulfurized compositions of this invention can be employed as general purpose antioxidants, extreme pressure and friction modifiers in a variety of lubricating compositions based on diverse oils of lubricating viscosity, including natural and synthetic lubricating oils and mixtures thereof. The lubricating compositions contemplated include crank-case lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions also can benefit from the incorporation of the present compositions.

The compositions of the invention can be added directly to the lubricant. Preferably, however, they are diluted with a substantially inert, normally liquid organic diluent such as mineral oil, naphtha, benzene, toluene or xylene, to form an additive concentrate. These concentrates usually contain from about 20% to about 90% by weight of the sulfurized compositions of this invention and may contain, in addition, one or more other additives known in the art and described below. The remainder of the concentrate is the substantially inert normally liquid diluent.

The lubricating oil compositions of the present invention comprise a major amount of oil of lubricating viscosity, including natural and synthetic lubricating oils and mixtures thereof.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinicnaphthenic types. Oils of lubricating viscosity derived from coal or shale are also useful. Synthetic lubricating oils include hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, of the $C_{13}$ Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)-silicate, tetra-(P-tert-butyl-phenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

The sulfurized compositions of the present invention will normally be employed in the lubricating composition of the invention in an amount of from about 0.001% to about 20% by weight of the particular oil in which they are utilized. The optimum amount to be used in a given lubricant obviously would depend on the other contents of the particular lubricating composition, the operating conditions to which it is to be subjected, and the particular additives employed. In lubricating compositions operated under extremely adverse conditions, such as lubricating compositions for marine diesel engines, the compositions may be present in the lubricant in amounts of up to about 30% by weight, or more, of the total weight of the lubricating composition.

The invention also contemplates the use of other additives in the lubricant compositions of this invention. Such additives are those normally used in lubricating oils such as, for example, detergents, dispersants, oxidation-inhibiting agents, pour point depressing agents, extreme pressure agents, antiwear agents, color stabilizers and anti-foam agents.

The ash-producing detergents are exemplified by oil-soluble neutral and basic salts of alkali or alkaline earth metals with sulfonic acids or carboxylic acids. The most commonly used salts of such acids are those of sodium, potassium, lithium, calcium, magnesium, strontium and barium.

The term "basic salt" is used to designate metal salts wherein the metal is present in stoichiometrically larger amounts than the organic acid group. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-betanaphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide; however, it does not oridinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent No. 1,306,529 and in many U.S. patents including the following U.S. Pat. Nos.: 3,163,603, 3,215,707, 3,271,310, 3,281,357, 3,311,558, 3,340,281, 3,346,493, 3,351,552, 3,399,141, 3,433,744, 3,448,048, 3,451,933, 3,467,668, 3,522,179, 3,541,012, 3,542,680, 3,574,101, 3,630,904, 3,632,511, 3,725,441, Re 26,433.

(2) Reaction products of relatively high molecular weight aliphatic or alicyclic halides with amines, preferably polyalkylene polyamines. These may be characterized as "amine dispersants" and examples thereof are described, for example, in the following U.S. Pat. Nos.: 3,275,554, 3,438,757, 3,454,555, 3,565,804.

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative U.S. Pat. Nos.: 2,459,112, 2,984,550, 3,166,516, 3,355,270, 3,413,347, 3,442,808, 3,454,497, 3,461,172, 3,539,633, 3,586,629, 3,591,598, 3,634,515, 3,697,574, 3,725,480, 3,980,569.

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, or the like. Exemplary materials of this type are described in the following U.S. Pat. Nos.: 3,036,003, 3,200,107, 3,254,025, 3,278,550, 3,281,428, 3,282,955, 3,366,569, 3,373,111, 3,442,808, 3,455,832, 3,493,520, 3,513,093, 3,539,633, 3,579,450, 3,600,372, 3,639,242, 3,649,659, 3,697,574, 3,703,536, 3,708,422.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Pat. Nos.: 3,329,658, 3,449,250, 3,519,565, 3,666,730, 3,687,849, 3,702,300.

The above-noted patents are incorporated by reference herein for their disclosures of ashless dispersants.

Auxiliary extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene. Group II metal phosphorodithioates also may be included in some of the lubricant. Examples of useful metal phosphorodithioates include zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol. When it is desired to formulate lubricating oils containing low amounts of phosphorus, such phosphorodithioiates should be avoided when possible.

Many of the above-mentioned auxiliary extreme pressure agents and corrosion-oxidation inhibitors also serve as antiwear agents. Zinc dialkylphosphorodithioates are well known examples.

Pour point depressants are a particularly useful type of additive often included in the lubricating oils described herein. The use of such pour point depressants in oil-based compositions to improve low temperature properties of oil-based compositions is well known in the art. See, for example, page 8 of "Lubricant Additives" by C. V. Smalheer and R. Kennedy Smith (Lezius-Hiles Co. publishers, Cleveland, Ohio, 1967).

Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in "Foam Control Agents", by Henry T. Kerner (Noyes Data Corporation, 1976), pages 125–162.

The sulfurized compositions of this invention have been found to be particularly effective as additives in metal working lubricants where they impart excellent extreme pressure characteristics to the lubricant. an ingredient which is often preferably included in the metal working lubricants of this invention (especially for stainless steel) is at least one chlorinated wax, especially a chlorinated paraffin wax. The chlorinated wax preferably has a molecular weight between about 350 and about 700 and contains about 30% to about 70% chlorine by weight.

Other additives which may optionally be present in the metal working lubricants for use in this invention include:

antioxidants, typically hindered phenols;

surfactants, usually nonionic surfactants such as oxyalkylated phenols and the like; and corrosion, wear and rust-inhibiting agents.

Friction modifying agents, of which the following are illustrative: alkyl or alkenyl phosphates or phosphites in which the alkyl or alkenyl group contains from about 10 to about 40 carbon atoms, and metal salts thereof, especially zinc salts; $C_{10-20}$ fatty acid amides; $C_{10-20}$ alkyl amines, especially tallow amines and ethoxylated derivatives thereof; salts of such amines with acids such as boric acid or phosphoric acid which have been partially esterified as noted above; $C_{10-20}$ alkyl-substituted imidazolines and similar nitrogen heterocycles.

The metal working lubricants whose use is contemplated according to this invention will generally contain from about 0.5% to about 15% by weight, preferably from about 1% to about 10%, of the sulfurized compositions of the invention. Other ingredients such as those described above will be present in amounts sufficient to provide the metal working lubricant with the properties such as antioxidants, corrosion-inhibition, wear-resistance, rust-inhibition, etc.

The following are illustrative examples of the concentrates and lubricants of the invention. All parts and percentages are by weight of the total composition unless otherwise indicated. All amounts listed in the examples, except those for mineral oil, are exclusive of oil present as diluent.

|  | Parts by Weight |
| --- | --- |
| Example A (Concentrate) | |
| Mineral oil | 50 |
| Product of Example 5 | 50 |

-continued

| | Parts by Weight |
|---|---|
| Example B (Concentrate) | |
| Mineral oil | 60 |
| Product of Example 6 | 40 |

TABLE I

| Examples C-G (Lubricants) | C | D | E | F | G |
|---|---|---|---|---|---|
| Mineral oil | 95 | 95 | 96 | 96 | 95 |
| Product of Example 1 | 5 | — | — | — | — |
| Product of Example 2 | — | 5 | — | — | — |
| Product of Example 4 | — | — | 4 | — | — |
| Product of Example 7 | — | — | — | 4 | — |
| Product of Example 15 | — | — | — | — | 5 |

TABLE II

| Examples H-J (Lubricants) | H | I | J |
|---|---|---|---|
| Mineral oil (SAE-80) | 93.48 | 93.68 | 93.995 |
| Product of Example 6 | 5.0 | — | — |
| Product of Example 16 | — | 5.0 | 4.0 |
| Zinc salt of O,O—di (C$_{12-14}$ alkyl) phosphorodithioic acid | 1.0 | 0.8 | 1.5 |
| Poly(alkyl methacrylate) pour point depressant | 0.5 | 0.5 | 0.5 |
| Silicone anti-foam agent | 0.02 | 0.02 | 0.005 |

TABLE III

| Examples K-L | K | L | M |
|---|---|---|---|
| Mineral oil | 95.0 | 93.0 | 94.0 |
| Product of Example 6 | 2.5 | — | 2.0 |
| Product of Example 16 | — | 3.5 | — |
| Chlorinated (about 42% chlorine) paraffin wax | 2.5 | 3.5 | 3.0 |
| Triphenyl phosphate | — | — | 1.0 |

Any metal to be worked may be treated according to the method of this invention. Examples are ferrous metals, aluminum, copper, magnesium, titanium, zinc and manganese. Alloys thereof, with and without other elements such as silicon, may also be treated; examples of suitable alloys are brass and various steels (e.g., stainless steel).

The metal working compositions used in the method of this invention can be applied to the metal workpiece prior to or during the working operation in any suitable manner. They may be applied to the entire surface of the metal, or to any portion of that surface with which contact is desired. For example, the lubricant can be brushed or sprayed on the metal, or the metal can be immersed in a bath of the lubricant. In high speed metal forming operations spraying or immersion are preferred.

In a typical embodiment of the method of this invention, a ferrous metal workpiece is coated with the lubricant prior to the working operation. For example, if the workpiece is to be cut, it may be coated with the lubricant before contact with the cutting tool. (The invention is particularly useful in connection with cutting operations.) It is also within the scope of the invention to apply the lubricant to the workpiece as it contacts the cutting tool, or to appy it to the cutting tool itself whereupon it is transferred to the workpiece by contact. Thus, the method of this invention in a generic sense comprises any metal working operation wherein the workpiece has on its surface, during said operation, the above-described lubricant regardless of how applied.

It has now been found that certain sulfurized compositions added to asphalt cement or asphalt concrete compositions, reduce deterioration and improve ductility of the asphalt composition.

The sulfur compositions useful to reduce deterioration of asphalt and asphalt containing compositions are prepared by reacting at an elevated temperature, a sulfurizing agent with (A) at least one fatty acid ester of a polyhydric alcohol, or (B) at least one fatty acid, fatty acid ester of a monohydric alcohol, or a mixture thereof, or (C) at least one other olefin, or (D) mixtures of any two or more of (A), (B) and (C) optionally in the presence of a catalytic amount of (E) at least one salt of at least one dithiocarbamic acid of the formula $$R_1(R_2)N-CSSH$$

wherein $R_1$ and $R_2$ are each independently hydrocarbyl groups, or (F) at least one mercapto benzothiazole, or (G) mixtures of (E) and (F).

The sulfurizing agents and elements A-G inclusive are as hereinbefore described. When the reagent being sulfurized is only the olefin (C), and catalysts (E) and (F) are not employed, it is preferred that the olefin be a monoolefin.

Stabilized asphalt compositions comprise a major amount of asphalt and a minor, stability improving amount of at least one sulfurized composition hereinabove described.

This invention also contemplates asphalt concrete comprising a major amount of at least one aggregate and a minor amount of asphalt cement containing a stabilized asphalt composition.

U.S. Pat. No. 4,119,549 discloses a method of preparing sulfur compounds employing a mixture of sulfur and hydrogen sulfide. U.S. Pat. No. Re. 27,331 describes sulfurized Diels-Alder adducts. U.S. Pat. No. 3,926,822 discloses sulfurized materials prepared by sulfurizing a mixture of a fatty acid ester and certain olefins and optionally a fatty acid.

These and other patents disclosed herein relating to sulfurization reactions and products obtained thereby are hereby incorporated by reference for the disclosures contained therein.

Sulfurization of unsaturated organic compounds is well known in the art and is discussed in detail at Volume 22, pages 255-266 of Kirk-Othmer, "Encyclopedia of Chemical Technology", 3rd Edition, John Wiley & Sons, 1983, which is hereby incorporated by reference.

As mentioned above, the sulfurizing agent may be sulfur, and the reaction is effected by heating the material to be sulfurized with sulfur at an elevated temperature, often from 100°-250° C., usually about 150°-210° C. with efficient agitation and in an inert atmosphere (e.g., nitrogen).

It is frequently advantageous to add the sulfur portionwise to the material being sulfurized. The reaction may be effected in the presence of an inert solvent such as alcohol, ether, ester, aliphatic hydrocarbon or halogenated aromatic hydrocarbon which is a liquid at the reaction temperatures employed.

Following the reaction, insoluble by-products may be removed by filtration, usually at an elevated temperature (about 80°–120° C.). The filtrate is the desired sulfurized product.

The sulfur containing asphalt compositions of the present invention comprise at least one sulfurized organic compound other than asphalt. A wide variety of sulfurized organic compounds can be utilized in the asphalt compositions of the present invention, and these compounds may generally be represented by the formula $$RS_xR_1 \qquad (II)$$

wherein S represents sulfur, x is a whole number having a value of from 1 to about 10, and R and $R_1$ may be the same or different organic groups. The organic groups may be hydrocarbon groups or substituted hydrocarbon groups containing alkyl, aryl, aralkyl, alkaryl, alkanoate, thiazole, imidazole, phosphorothionate, beta-ketoalkyl groups, etc. The substantially hydrocarbon groups may contain other substituents such as halogen, amino, hydroxyl, mercapto, alkoxy, aryloxy, thio, nitro, sulfonic acid, carboxylic acid, carboxylic acid ester, etc.

Specific examples of types of sulfurized compositions which are useful in the asphalt compositions of this invention include aromatic, alkyl or alkenyl sulfides and polysulfides, sulfurized olefins, sulfurized carboxylic acid esters, sulfurized ester olefins, sulfurized oil, and mixtures thereof. The preparation of such sulfurized compositions is described in the art.

The sulfurized organic compounds utilized in the asphalt compositions of the present invention may be aromatic and alkyl sulfides such as dibenzyl sulfide, dixylyl sulfide, dicetyl sulfide, diparaffin wax sulfide and polysulfide, cracked wax oleum sulfides, etc. One method of preparing the aromatic and alkyl sulfides includes the condensation of a chlorinated hydrocarbon with an inorganic sulfide whereby the chlorine atom from each of two molecules is displaced, and the free valence from each molecule is joined to a divalent sulfur atom. Generally, the reaction is conducted in the presence of elemental sulfur.

Examples of dialkenyl sulfides which are useful in the compositions of the present invention are described in U.S. Pat. No. 2,446,072. These sulfides can be prepared by interacting an olefinic hydrocarbon containing from 3 to 12 carbon atoms with elemental sulfur in the presence of zinc or a similar metal generally in the form of an acid salt. Examples of sulfides of this type include 6,6'-dithiobis(5-methyl-4-nonene), 2-butenyl monosulfide and disulfide; and 2-methyl-2-butenyl monosulfide and disulfide.

In addition to the sulfur compounds described hereinabove, the following examples are non-limiting examples of sulfurized materials useful in the asphalt compositions of this invention.

EXAMPLE 20

A mixture of 60 parts of commercial $C_{15-20}$ alpha-olefins and 100 parts of lard oil is heated to 160° C., under nitrogen, and 12 parts of sulfur is added. The mixture is heated at 165°–200° C. and an additional 6.5 parts of sulfur is added. Heating is continued for 4 hours, after which the mixture is cooled to 100° C. and filtered to yield the desired product which contains 9.0% sulfur.

EXAMPLE 21

To a mixture of 100 parts of soybean oil and 50 parts of 1-hexadecene at 165° C., under nitrogen, is added over 20 minutes, with stirring 20.6 parts of sulfur. An exothermic reaction occurs which causes the temperature to rise to 200° C. It is heated at 175°–200° C. for 6 hours, cooled to 110° C. and filtered to yield the desired product which contains 11.1% suflur.

EXAMPLE 22

A mixture of 100 parts of soybean oil and 50 parts of commercial $C_{16}$ alpha-olefins is heated to 175° C. under nitrogen and 17.4 parts of sulfur is added gradually, whereupon an exothermic reaction causes the temperature to rise to 205° C. The mixture is heated at 188° C.–200° C. for 5 hours, allowed to cool gradually to 90° C. and filtered to yield the desired product containing 10.13% sulfur.

EXAMPLE 23

Following the procedure of Example 22, a sulfurized product is prepared from 100 parts of soybean oil, 50 parts of commercial $C_{15-18}$ alpha-olefins and 17.4 parts of sulfur. It contains 10.1% sulfur.

EXAMPLE 24

Following the procedure of Example 22, a product containing 10.13% sulfur is obtained by the reaction of 100 parts of soybean oil, 50 parts of commercial $C_{15-20}$ alpha-olefins and 17.9 parts of sulfur.

EXAMPLE 25

Following the procedure of Example 22, a product containing 9.69% sulfur is obtained from 100 parts of soybean oil, 100 parts of commercial $C_{22-28}$ alpha-olefins and 23.2 parts of sulfur.

EXAMPLE 26

Following the procedure of Example 22, a product containing 10.16% sulfur is obtained from 100 parts of cottonseed oil, 33.3 parts of commercial $C_{15-20}$ alpha-olefins and 15.6 parts of sulfur.

EXAMPLE 27

Following the procedure of Example 22, a product containing 8.81% sulfur is obtained from 100 parts of a triglyceride having an iodine number of 85–95, 25 parts of commercial $C_{15-18}$ alpha-olefins and 14.5 parts of sulfur.

EXAMPLE 28

A mixture of 100 parts of soybean oil, 50 parts of comemrcial $C_{15-18}$ alpha-olefins, 1.17 part of triphenyl phosphite and 17.4 parts of sulfur is heated for 16 hours at 145°–165° C., under nitrogen. It is then cooled to room temperature, reheated to 100° C. and filtered with the addition of a filter and material. The filtered product contains 10.13% sulfur.

EXAMPLE 29

A mixture of 100 parts of soybean oil, 3.7 parts of tall oil acid and 46.3 parts of commercial $C_{15-18}$ alpha-olefins is heated to 165° C. under nitrogen, and 17.4 parts of sulfur is added. The temperature of the mixture rises to 191° C. It is maintained at 165°–200° C. for 7 hours and is then cooled to 90° C. and filtered. The product contains 10.13% sulfur.

EXAMPLE 30

Following the procedure of Example 29, a product containing 10.39% sulfur is obtained from 100 parts of soybean oil, 4 parts of tall oil acid, 46.3 parts of commercial $C_{15-18}$ alpha-olefins and 20.6 parts of sulfur.

EXAMPLE 31

Following the procedure of Example 29, a product containing 10.6% sulfur is obtained from 100 parts of soybean oil, 5.25 parts of tall oil acid, 44.8 parts of commercial $C_{15-18}$ alpha-olefins and 17.4 parts of sulfur.

EXAMPLE 32

Following the procedure of Example 29, a product containing 10.4% sulfur is obtained from 100 parts of peanut oil, 5.26 parts of tall oil acid, 45 parts of commercial $C_{15-18}$ alpha-olefins and 17.5 parts of sulfur.

EXAMPLE 33

Following the procedure of Example 29, a product containing 12.41% sulfur is obtained from 100 parts of soybean oil, 5.35 parts of tall oil acid, 46.3 parts of commercial $C_{15-18}$ alpha-olefins and 26.8 parts of sulfur.

EXAMPLE 34

Following the procedure of Example 29, a product containing 9.98% sulfur is obtained from 100 parts of soybean oil, 4.11 parts of tall oil acid, 44.8 parts of a mixture of $C_{12-16}$ fractions from the polymerization of isobutene, and 20.8 parts of sulfur.

EXAMPLE 35

A product containing 13.7% sulfur is obtained from 100 parts of soybean oil, 5.4 parts of tall oil acid, 46.2 parts of commercial $C_{15-18}$ alpha-olefins, 1.5 parts of triphenyl phosphite and 25 parts of sulfur following the procedure of Example 10 except that a temperature range of 135°–165° C. is employed.

EXAMPLE 36

Following the procedure of Example 29, a product containing 9.54% sulfur is obtained from 100 parts of soybean oil, 5.53 parts of tall oil acid, 50.2 parts of commercial $C_{15-18}$ alpha-olefins, 3.18 parts of lecithin and 18.4 parts of sulfur.

EXAMPLE 37

A product is prepared from 100 parts of soybean oil, 5.4 parts of tall oil acid, 46.3 parts of commercial $C_{15-18}$ alpha-olefin and 24.8 parts of sulfur, following the procedure of Example 29 except that the temperature is 150°–165° C. It contains 13.6% sulfur.

EXAMPLE 38

(a) To 255 grams (1.65 moles) of the isoprene-methacrylate adduct of Example DA-3 heated to a temperature of 110°–120° C., there are added 53 grams (1.65 moles) of sulfur flowers over a 45 minute period. The heating is continued for 4.5 hours at a temperature in the range of 130°–160° C. After cooling to room temperature, the reaction mixture is filtered through a medium sintered glass funnel. The filtrate consists of 301 grams of the desired sulfur-containing products.

(b) In part (a), the ratio of sulfur to adduct is 1:1. In this example, the ratio is 5:1. Thus, 640 grams (20 moles) of sulfur flowers is heated in a three-leter flask at 170° C. for about 0.3 hour. Thereafter, 600 grams (4 moles) of the isoprene-methacrylate adduct of Example DA-3 is added dropwise to the molten sulfur while maintaining the temperature at 174°–198° C. Upon cooling to room temperature, the reaction mass is filtered as above, the filtrate being the desired product.

(c) seven hundred and fifty grams (5 moles) of the adduct employed in (a) and (b) above is heated to 105° C. under reflux conditions. To the heated adduct is added 320 grams (10 moles) of sulfur flowers in five increments over a 0.75 hour period while maintaining the temperature of the reaction mass at 105°–112° C. The reaction mixture is heated for 6 hours at 150°–155° C. while bubbling nitrogen through the reaction mass at a rate of 0.25 to 0.5 standard cubic feet per hour. The reaction mass is then cooled and filtered at room temperature yielding 1005 grams of the desired products.

EXAMPLE 39

(a) A reaction mixture comprising 1175 grams (6 moles) of the Diels-Alder adduct of butylacrylate and isoprene and 384 grams (12 moles) of sulfur flowers is heated for 0.5 hour at 1.08°–110° C. and then to 155°–165° C. for 6 hours while bubbling nitrogen gas through the reaction mixture at 0.25 to 0.5 standard cubic feet per hour. At the end of the heating period, the reaction mixture is allowed to cool and filtered at room temperature. Thereafter, the product is permitted to stand for 24 hours and refiltered. The filtrate weighing 1278 grams is the desired product.

(b) Following the procedure of Example 39(a), 1275 grams (6.5 moles) of the adduct and 208 grams (6.5 moles) of sulfur flowers are reacted to produce 1421 grams of the desired sulfur-containing reaction products.

(c) Again, following the technique of (a), 2,450 grams (12.5 moles) of the adduct of isoprene and butylacrylate is reacted with 600 grams of sulfur (18.75 moles) to produce 2814 grams of the desired sulfur-containing products.

EXAMPLE 40

(a) Sulfur (4.5 moles) and the adduct of isoprene-methyl-methacrylate (4.5 moles) are mixed at room temperature and heated for 1 hour at 110° C. while blowing nitrogen through the reaction mass at 0.25–0.5 standard cubic feet per hour. Subsequently the reaction mixture is raised to a temperature of 150°–155° C. for 6 hours while maintaining the nitrogen blowing. After heating, the reaction mass is permitted to stand for several hours while cooling to room temperature and is thereafter filtered. The filtrate consists of 842 grams of the reaction mixture of the desired sulfur-containing product.

(b) Employing the technique of (a), 7.96 moles of sulfur flowers are reacted with 3.98 moles of the isoprene-methyl-methacrylate adduct to produce 857 grams of the product.

EXAMPLE 41

(a) Seven hundred grams (5.04 moles) of the adduct of butadiene and methylacrylate are mixed with 323 grams (10.08 moles) of sulfur flowers in the presence of 3% by weight based on the adduct of hydroquinone. The reactants are heated under reflux conditions while bubbling nitrogen through the reaction mass. Heating is gradual at first (room temperature to 110° C. during the first hour and from 110° C. to 140° C. during the second hour). Thereafter, the reaction mixture is heated for 6 hours at a temperature within the range of 150°–160° C., permitted to cool to room temperature, and filtered twice. The filtrate consists of 930 grams of the desired sulfur-containing products.

(b) The same process as employed in (a) is repeated employing as the adduct a distilled butadiene-methylacrylate adduct which boils over the range of 71°–78° C. under a pressure of 18–19 millimeters of mercury. The reactants, 550 grams of the adduct (4.0 moles) and 256 grams of sulfur flowers (8.0 moles) are placed in a flask fitted with reflux condenser and a nitrogen gas inlet. The mixture is heated under reflux conditions for about 8½ hours at a temperature within the range of 150°–160° C. while bubbling nitrogen gas through the mass at a rate of about 0.5 standard cubic feet per hour. Upon cooling to room temperature, the product is filtered yielding 810 grams of the desired product as the filtrate.

EXAMPLE 42

A one-liter flask fitted with a stirrer, reflux condenser, and nitrogen inlet line is charged with 256 grams (1 mole) of the adduct of butadiene and isodecylacrylate and 64 grams (2 moles) of sulfur flowers and then heated for 12 hours at a temperature of 200° C., stand for 21 hours, and filtered at room temperature to produce 286 grams of the desired product as the filtrate.

EXAMPLE 43

(a) A mixture comprising 420 grams (1.5 moles) of the adduct of isoprene and decylacrylate and 96 grams of sulfur flowers (3.0 moles) are reacted as in Example V producing 466 grams of the desired products.

(b) Employing the same reactants as in (a) above, the process conditions are modified and the ratio of sulfur to adduct increased from 2:1 to 7:1. A two-liter flask is charged with 224 grams of sulfur flowers (7.0 moles) and heated to 120° C. to convert the sulfur to the molten state. Thereafter, 280 grams of the adduct is added in increments while raising the temperature of the reaction mass to 200° C. The reaction mass is heated for 11½ hours at a temperature of 200°–244° C. Upon cooling, there was recovered 366 grams of a dark red viscous liquid which comprises the desired reaction products.

EXAMPLE 44

(a) 4550 grams (25 moles) of the adduct of butadiene-butylacrylate and 1600 grams (50 moles) of sulfur flowers are charged to a 12 liter flask, fitted with stirrer, reflux condenser, and nitrogen inlet tube. The reaction mixture is heated at a temperature within the range of 150°–155° C. for 7 hours while passing nitrogen therethrough at a rate of about 0.5 cubic feet per hours. After heating, the mass is permitted to cool to room temperature and filtered, the sulfur-containing products being the filtrate.

One thousand grams of the product of 44(a) obtained before filtering are heated to 100° C. in a three-liter flask fitted with a reflux condenser and stirrer. While stirring the adduct under at high speed, 1000 grams of the sodium sulfide solution are added over a one-minute period, cooling the mass to 38° C. The resulting mixture is again heated to 50° C. and held within the range of 42°–50° C. for one hour using an infrared lamp. Upon standing, the reaction mixture separates into an aqueous phase and an organic phase. The lower or aqueous phase is removed. A 440 gram portion of the organic layer is filtered giving a filtrate weighing 401 grams which is the desired product. The remaining portion of the organic layer is washed in 500 grams of water at 40° C. for 10 minutes and thereafter allowed to separate. The organic layer weighing 358 grams is stripped to remove the water. The product after water removal weighed 322 grams. The product obtained by the direct filtration of the sodium sulfide treated sulfur-containing adduct and the product obtained by first washing the sodium sulfide treated adduct were the same, both being substantially free from sodium.

(b) Following the procedure of 44(a), 1092 grams (6 moles) of the adduct of butadiene and butylacrylate and 192 grams (6 moles) of sulfur flowers are heated for 7 hours at a temperature of 150°–155° C. After cooling the filtering, 1217 grams of a clear, yellow liquid filtrate is obtained as the product.

EXAMPLE 45

The adduct of butadiene-butylacrylate was prepared by charging 513 grams (4 moles) of butadiene-1,3 to a two-liter flask fitted with a stirrer, reflux condenser, and nitrogen inlet tube. To the butadiene is added 50.4 grams of aluminum chloride ($AlCl_3$) over a one-minute period while stirring the reaction mixture at a temperature within the range of 25°–28° C. A colorless clear solution resulted. The butadiene was blown into the aluminum chloride-butylacrylate mixture over a 1.75 hour period while maintaining the reaction mass at a temperature of 28°–59° C. Then the reaction mass is stirred for two hours while maintaining the temperature within the range of 41°–52° C. followed by the addition of a solution of 150 mililiters of concentrated hydrochloric acid and 1000 grams of water to the reaction mass to hydrolyze the aluminum chloride. The resulting aqueous phase of the reaction mass is discarded. The organic phase is washed with 1000 mililiters of water at 40° C. and the resulting aqueous phase is discarded leaving the organic phase at the desired adduct weighing 735 grams.

Two hundred grams of this product (1.1 moles) and 70.5 grams of sulfur flowers (2.2 moles) are mixed in a one-liter flask fitted with a stirrer, reflex condenser, and nitrogen inlet tube. The mixture is heated to about 150°–160° C. for 7 hours. During the reaction, nitrogen gas is blown through the reaction mass at a rate of about 0.25 standard cubic feet per hour. The resulting light orange colored liquid weighing 260 grams is then charged to a three-liter flask fitted with a stirrer and reflux condenser. A mixture of 173 grams of toluene and 260 grams of a 6% sodium sulfide solution in water are then added to the reaction mass and stirred at high speed for one hour at room temperature. After separating into two phases, there is obtained a 405 gram organic phase which is light yellow in color. This organic layer is stripped at reduced pressure to remove water and toluene. The residue weighing 235 grams is a light yellow oil which is filtered to produce 210 grams of the desired purified product as the filtrate.

EXAMPLE 46

Following the same technique as employed in Example 45 above, 546 grams (3 moles) of the Diels-Alder adduct of butadiene and butylacrylate and 192 grams (6.0 moles) of sulfur flowers are reacted in the presence of 5.5 grams of triamylamine as a sulfurization catalyst. After filtering the product, 659 grams of filtrate consisting of a clear deep orange slightly viscous oil is obtained as the desired sulfur-containing products.

EXAMPLE 47

A reaction mixture comprising 782 grams (4.3 moles) of the Diels-Alder adduct of butadiene and butylacrylate and 138 grams (4.3 moles) of sulfur flowers is gradually heated from room temperature to 150° C. over a one-hour period and thereafter maintained at a temperature of 150°-160° C. for 6 hours. The reaction product is then permitted to cool to room temperature and stand for about 12 hours. The product is filtered providing 869 grams of filtrate representing the desired sulfur-containing reaction products.

EXAMPLE 48

Sulfur (526 parts, 16.4 moles) is charged to a jacketed high pressure reactor which is fitted with an agitator and internal cooling coils. Refrigerated brine is circulated through the coils to cool the reactor prior to the introduction of the gaseous reactants. After sealing the reactor, evacuating to about 2 torr and cooling, 920 parts (16.4 moles) of isobutene and 279 parts (8.2 moles) of hydrogen sulfide are charged to the reactor. The reactor is heated using steam in the external jacket, to a temperature of about 182° C. (360° F.) over about 1.5 hours. A maximum pressure of 1350 psig. is reached at about 168° C. (335° F.) during this heat-up. Prior to reaching the peak reaction temperature, the pressure starts to decrease and continues to decrease steadily as the gaseous reactants are consumed. After about 10 hours at a reaction temperature of about 182° C., the pressure is 310–340 psig. and the rate of pressure change is about 5–10 psig. per hour. The unreacted hydrogen sulfide and isobutene are vented to a recovery system. After the pressure in the reactor has decreased to atmospheric, the sulfurized mixture is recovered as a liquid. The mixture is blown with nitrogen at about 100° C. (212° F.) to remove low boiling materials including unreacted isobutene, mercaptans and monosulfides. The residue after nitrogen blowing is agitated with 5% Super Filtrol and filtered, using a diatomaceous earth filter aid. The filtrate is the desired sulfurized composition which contains 42.5% sulfur.

EXAMPLES 49–63

In examples 49–63, the general procedure of Example 48 is followed with the omission of the acidic clay treatment and with variables such as reactant ratio, reaction temperature and the composition of the reaction mixture being varied. Separation of low boiling materials in Examples 49–62 is effected by first blowing with nitrogen and then vacuum stripping; in Example 63, it is effected by vacuum distillation without nitrogen blowing. In those examples where water is present, the crude product is first separated from the aqueous layer and then worked up in the usual manner.

The experimental details as well as the results obtained are summarized in Table IV. Percentages of reactant, mercaptans and monosulfides are determined by vapor phase chromatography.

TABLE IV

| Example | Mole ratio, isobutene: sulfur: $H_2S$ | Temp., °C. | Catalyst Identity | Catalyst Amount[1] | % Reactants, mercaptans and Monosulfides In crude product | % Reactants, mercaptans and Monosulfides In final product | % Sulfur in product |
|---|---|---|---|---|---|---|---|
| 49 | 1:1:0.4 | 171 | None | — | 13.7 | 3.7 | 43.65 |
| 50 | 1:1:0.4 | 193 | None | — | 11.5 | 4.5 | 44.22 |
| 51 | 1:1.2:0.8 | 193 | None | — | 15.0 | 5.0 | 51.43 |
| 52 | 1:1.2:0.4 | 171 | None | — | 12.4 | 2.5 | 48.7 |
| 53 | 1:1:0.5 | 182 | $H_2O$ | 5% | 12.8 | 1.5 | — |
| 54 | 1:1:0.5 | 171 | $Na_2S$ | 0.005 mole[2] | 9.6 | 0.8 | 47.6 |
| 55 | 1:1:0.5 | 182 | $NH_4OH$ | 0.005 mole[3] | 9.6 | 1.4 | 47.0 |
| 56 | 1:1:0.5 | 171 | $n-C_4H_9NH_2$ | 0.0005 mole | 8.1 | 0.75 | 46.5 |
| 57 | 1:1:0.5 | 171 | $NH_3$(anhydrous) | 0.005 mole | 12.3 | 0.55 | 48.1 |
| 58 | 1:0.8:0.5 | 171 | $n-C_4H_9NH_2$ | 0.005 mole | 19.2 | 0.2 | 44.8 |
| 59 | 1:1.2:0.5 | 171 | $n-C_4H_9NH_2$ | 0.005 mole | 5.22 | 1.0 | 52.5 |
| 60 | 1:1:0.5 | 171 | p-Toluenesulfonic acid | 1% | — | — | — |
| 61 | 1:1:0.5 | 171 | $P_2S_5$ | 2% | — | — | — |
| 62 | 1:1:0.5 | 171 | Super Filtrol | 0.13% | — | — | — |
| 63 | 1:1:0.5 | 171 | $(C_2H_5)_3N$ | 0.005 mole[4] | 5.8 | 0 | — |

[1]Percentages are based on weight of reactants; mole amounts are per mole of isobutene.
[2]Added as 18% aqueous solution.
[3]Added as 28% aqueous solution.
[4]Added as an approximately 30% admixture with sulfurized product from previous run.

EXAMPLES 64–78

Various olefinic compounds are sulfurized by the general method of Example 48. The catalyst in each example is n-butylamine (0.34% of olefinic compound). The separation step includes vacuum distillation. The details are summarized in Table V.

TABLE V

| Example | Olefinic compound | Molar ratio[1] | Temp., °C. | % sulfur in product |
|---|---|---|---|---|
| 64 | Isobutene; 1-butene[2] | 1:1:0.5 | 171 | 46.9 |
| 65 | 1-Octene | 1:1.5:0.5 | 171 | 34.3 |
| 66 | Isobutene: 1-octene[3] | 1:1:0.5 | 171 | 44. |
| 67 | Diisobutene | 1:1.5:0.5 | 171 | 41. |
| 68 | $C_{16}$–$C_{18}$ alpha-olefin | 1:1.5:0.5 | 171 | 20.6 |
| 69 | Cyclohexene | 1:1:0.5 | 171 | 31.8 |
| 70 | Isobutene; 1-hexene[2] | 1:1:0.5 | 171 | 39.5 |
| 71 | Methyl oleate | 1:1.5:0.5 | 171 | 16.5 |
| 72 | alpha-Methylstyrene | 1:1:0.5 | 171 | 39.2 |
| 73 | Isobutene; butadiene[3] | 1:1:0.5 | 171 | 47.2 |
| 74 | Polyisobutene[4] | 1:1.5:0.5 | 171 | 2.6 |
| 75 | Triisobutene[5] | 1:1.5:0.5 | 171 | — |
| 76 | 1-Butene | 1:1:0.5 | 138–171 | 49.5 |
| 77 | Isodecyl acrylate | 1:0.5:0.5 | 171 | 13.1 |
| 78 | Diels-Alder adduct of butadiene and | 1:1.5:0.5 | 171 | 25.1 |

TABLE V-continued

| Example | Olefinic compound | Molar ratio[1] | Temp., °C. | % sulfur in product |
|---------|-------------------|----------------|------------|---------------------|
|         | butyl acrylate    |                |            |                     |

[1]Olefinic compound(s):S:H$_2$S.
[2]1:1 molar ratio.
[3]0.9:0.1 molar ratio
[4]Number average molecular weight of about 1000 as determined by vapor pressure osmometry.
[5]No separation step.

For use in the asphalt composition of this invention, sulfur compositions prepared employing (E), (F) or (G), other catalysts, or those sulfur compositions prepared without any added catalyst may be used. As previously noted herein, the sulfurized composition prepared using the catalysts (E), (F) or (G) have a reduced odor compared to sulfurized compositions prepared in the absence of such catalysts. When the asphalt compositions are prepared, mixing is often effected at elevated temperatures, and under some circumstances, use of an odorous sulfur compound in the asphalt composition may be objectionable. It is, therefore, preferred to prepare the asphalt compositions of this invention using the sulfurized compositions prepared in the presence of a catalytic amount of catalysts (E), (F) or (G).

The sulfur compositions are preferably present in the asphalt composition at about 0.01 to about 20% by weight of asphalt cement, more preferably about 0.1 to about 10% by weight of asphalt cement and most preferably from about 0.5 to about 5% by weight of asphalt cement.

Asphalt is defined by the American Society for Testing and Materials as a dark brown to black cementitious material in which the predominating constituents are bitumens that occur in nature or are obtained in petroleum processing. A discussion of asphalt, its sources, uses, characterization of asphalt and the like appears in Kirk-Othmer, "Encyclopedia of Chemical Technology", 3rd Edition, John Wiley & Sons, 1983, Vol. 3, pages 284-327. An additional discussion appears in the publication entitled "A Brief Introduction to Asphalt and Some of its Uses", Manual Series No. 5 (MS-5), The Asphalt Institute, 7th Edition, September, 1974. Both of these publications are hereby incorporated by reference.

Asphalt cements are generally free of any aggregate such as stone, gravel and the like. Asphalt concrete contains both asphalt cement and an aggregate.

Liquid asphalt cements treated with the sulfurized compositions of the invention show major benefits in retained flexibility when exposed to very severe aging as demonstrated by the California Tilt-Oven Asphalt Durability test. Test briquettes exposed to accelerated laboratory aging show a greatly reduced tendency to age harden. Measurement of low temperature elastic modulus, after accelerated laboratory aging, shows dramatic improvement with the presence of the sulfurized compositions.

Asphalt cements are often specified by the American Association of State Highway Transportation Officials (AASHTO) AR viscosity grading system. Two sets of specifications are:

| AASHTO M-226 | | | | | | |
|---|---|---|---|---|---|---|
| TEST | AC 2.5 | AC 5 | AC 10 | AC 20 | AC 30 | AC 40 |
| Vis @ 140° F., poise (AASHTO T-202) | 250 +−50 | 500 +−100 | 1000 +−200 | 2000 +−400 | 3000 +−600 | 4000 +−800 |
| Vis @ 275° F., CST, minimum(AASHTO T-201) | 125 | 175 | 250 | 300 | 350 | 400 |
| Pen @ 77° F., minimum (AASHTO T-49) | 220 | 140 | 80 | 60 | 50 | 40 |
| Flash Point, COC Minimum °F. | 325 | 350 | 425 | 450 | 450 | 450 |
| Ductility After TFOT (AASHTO T-179) @ 77° F., 5 CM/MIN, minimum | 100 | 100 | 75 | 50 | 40 | 25 |
| Vis After TFTO (AASHTO T-179) @ 140° F., poise minimum | 1000 | 2000 | 4000 | 8000 | 12000 | 16000 |
| TEST | AR1000 | AR2000 | AR4000 | AR8000 | RT1600 | |
| Vis @ 140° F., poise (AASHTO T-202) | 1000 +−250 | 2000 +−500 | 4000 +−1000 | 8000 +−2000 | 16000 +−4000 | |
| Vis @ 275° F., CST minimum (AASHTO T-201) | 140 | 200 | 275 | 400 | 550 | |
| Pen @ 77° F., minimum (AASHTO T-49) | 65 | 40 | 25 | 20 | 20 | |
| Percent Of Original Penn @ 77° F., minimum | — | 40 | 45 | 50 | 52 | |
| Ductility @ 77° F., minimum, 5 cm/min | 100 | 100 | 75 | 75 | 75 | |

EXAMPLE M

One asphalt cement (CV-AR 4000) is treated with 2% and 4% wt. of the product of Example 11. This asphalt cement meets the specification of AAHSTO AR 4000. The asphalt cement is a California Valley asphalt cement, widely distributed throughout the Western states.

The modified asphalt cement is exposed to oxidative conditions and compared to the same asphalt cement untreated. The test employed is the Rolling-Thin Film Oven Test (ASTM D2872), a standard test method to evaluate the effect of heat and air on a moving film of semi-solid asphaltic material. A moving film of asphaltic material is heated in a specially equipped convection oven for 75 minutes at 325° F. Heated air is blown into each container once each revolution. The amount of hardening is determined from changes in physical test values as measured before and after oven treatment. ASTM Procedure D-2872 is herein incorporated by reference.

Test results are presented in the following Table VI.

The modified asphalt cements were exposed to oxidative conditions and compared to the same asphalt cement untreated. The test employed is the California Tilt-Oven Asphalt Durability Test, developed by California Department of Transporation personnel in an effort to establish an accelerated laboratory procedure to simulate field aging in hot climates. The method, as well as data correlating laboratory and field aging, is published in the AAPT 1981 Proceedings. The presen-

TABLE VI

TEST RESULTS
ROLLING THIN FILM OVEN TEST
(ASTM D2872)

| TEST AC: PROPERTY TESTED | CV-AR4000 UNTREATED | CV-AR4000 PLUS 2% EX 11 | CV-AR4000 PLUS 4% EX 11 |
| --- | --- | --- | --- |
| Vis @ 140° F. (poise)-unaged | 2105 | 1655 | 860 |
| Vis @ 140° F. (poise)-aged | 3625 | 2340 | 1660 |
| Viscosity Increase-Poise | 1520 | 685 | 800 |
| Aging Ratio | 1.7 | 1.4 | 1.9 |
| Vis @ 275° F.(cst)-unaged | 347 | 225 | 195 |
| Vis @ 275° F.(cst)-aged | 539 | 302 | 255 |
| Viscosity Increase-cst | 192 | 77 | 60 |
| Aging Ratio | 1.6 | 1.3 | 1.3 |
| Pen @ 77° F.(ddm)-unaged | 37 | 57 | 90 |
| Pen @ 77° F.(ddm)-aged | 28 | 43 | 60 |
| Loss in Penetration(dmm) | 9 | 14 | 30 |
| Percent retained(%) | 75.7 | 75.4 | 66.7 |
| Ductility @ 77° F.(cm)-unaged | 150+ | 150+ | 150+ |
| Ductility @ 77° F.(cm)-aged | 150+ | 150+ | 150+ |

EXAMPLE N

Two asphalt cements (CV-AR4000 and CC-AR4000) were treated with various dosages of the product of EX 11.

The asphalt cements tested were a California Valley asphalt cement (CV) and a California Coastal asphalt cement (CC). Both are widely distributed throughout the Western United States.

tation is entitled "A Comparison of Field and Laboratory Environments on Asphalt Durability". The authors are Glenn R. Kemp and Nelson H. Predoehl. The test procedure is correlated to 24 months in a hot desert climate.

The method utilizes apparatus required for ASTM D2872 (Rolling Thin Film Oven Test) with slight modifications to weather semi-solid asphalt at 235° F. (113° C.) for 168 hours. ASTM D 2872 is herein incorporated by reference.

Test results appear on the following Table VII.

TABLE VII

TEST RESULTS
CALIFORNIA TILT-OVEN ASPHALT DURABILITY TEST

| TEST AC: PROPERTY TESTED | CV-AR4000 UNTREATED | CV-AR4000 PLUS 2% EX 11 | CV-AR4000 PLUS 4% EX 11 | CC-AR4000 UNTREATED | CC-AR4000 PLUS 4% EX 11 |
| --- | --- | --- | --- | --- | --- |
| Vis @ 140° F. (poise)-unaged | 2134 | 1415 | 910 | 1080 | 581 |
| Vis @ 140° F. (poise)-aged | 20336 | 14045 | 10170 | 87020 | 14583 |
| Viscosity Increase-poise | 18202 | 12630 | 9260 | 85940 | 14002 |
| Aging Ratio | 9.5 | 9.9 | 11.2 | 80.6 | 24.1 |
| Pen @ 77° F. (dmm)-unaged | 36 | 64 | 95 | 91 | 189 |
| Pen @ 77° F. (dmm)-aged | 10 | 16 | 17 | 19 | 35 |
| Loss in Penetration(dmm) | 26 | 48 | 78 | 72 | 154 |
| Percent Retained(%) | 27.8 | 25 | 17.9 | 20.9 | 18.5 |
| Ductility @ 77° F. (cm)-aged | 150+ | 150+ | 120+ | 150+ | |

TABLE VII-continued

TEST RESULTS
CALIFORNIA TILT-OVEN ASPHALT DURABILITY TEST

| TEST AC: PROPERTY TESTED | CV-AR4000 UNTREATED | CV-AR4000 PLUS 2% EX 11 | CV-AR4000 PLUS 4% EX 11 | CC-AR4000 UNTREATED | CC-AR4000 PLUS 4% EX 11 |
|---|---|---|---|---|---|
| Ductility @ 77° F. (cm)-aged | 12.5 | 150+ | 150+ | 8.8 | 92 |
| Loss in Ductility(cm) | 137.5+ | 0 | 0 | 111.2+ | 58+ |

The improvement in ductility @ 77° F. after this very severe laboratory aging procedure is noteworthy. It indicates that a pavement will retain flexibility and life after long exposure to weathering.

EXAMPLE O

An asphalt composition is prepared comprising 2% by weight of the product of Example 30 in an asphalt meeting the AR4000 specification.

ENGINEERING PROPERTY TESTS

Engineering property tests were conducted with 4 asphalt cements, untreated and treated with various dosages of the product of Example 11. Tests are conducted using two aggregates. The asphalt cements are as described hereinabove.

Testing included Marshall Stability and Flow both before and after accelerated laboratory curing and the Indirect Tensile Test conducted at 39.2° F. after accelerated laboratory aging.

TEST METHODS USED FOR EVALUATION OF ASPHALTIC CONCRETE

Marshall Stability Test

Marshall stabilities and flow values are determined using a Marshall loading apparatus as described in ASTM D 1559, which is hereby incorporated by reference. The compacted specimens are loaded at 140° F. at a constant deformation rate of 2 inches per minute and the load and corresponding vertical deformations are recorded.

Static Indirect Tensile Test

The indirect tensile test, which estimates the tensile strength of the aspalt mixtures, uses the following equipment and procedures.

A cylindrical specimen is loaded with a compressive load acting parallel to and along the vertical diametral plane. The load, which is distributed through 0.5-inch wide steel loading strips curved to fit the specimen, produces a fairly uniform tensile stress perpendicular to the plane of the applied load. The specimen ultimately fails by splitting along the vertical diameter. An estimate of the tensile strength is calculated from the applied load at failure and the specimen dimensions.

EXAMPLE P

Initial testing was conducted utilizing a laboratory standard aggregate. This is an aggregate mixture commonly utilized in Northeast Ohio. It is a mixture of #8 Canadian limestone and lake sand. A detailed description is given in Table VII. Mixing was accomplished in a Hobart mixer at 280° F. 20 blows of a mechanical Marshall hammer were utilized to produce specimen air voids of 7 to 9%. Testing included Marshall Stability and Flow both before and after accelerated laboratory curing (Tables IX) and the Indirect Tensile Test conducted at 39.2° F. after accelerated laboratory aging (X).

TABLE VIII

LABORATORY STANDARD AGGREGATE MIX DESIGN

| COMPONENT | CONCENTRATION |
|---|---|
| Crushed Limestone Presque Isle, #8 | 49.2% |
| Lake Sand | 50.8% |
| GRADATION | (% PASSING) |
| ½" | 100.0 |
| ⅜" | 98.0 |
| #4 | 60.0 |
| #16 | 46.5 |
| #50 | 10.8 |
| #200 | 1.8 |
| ASPHALT CEMENT CONTENT | |
| 6.5% wt. | |

TABLE IX

MARSHALL STABILITY TEST RESULTS
LABORATORY STANDARD AGGREGATE
ASTM D1559
TESTED WITHOUT ACCELERATED LABORATORY AGING
ALL DATA AVERAGE OF THREE SPECIMENS

| MIXTURE CONTAINING: | MARSHALL STABILITY | | | % Chg. |
|---|---|---|---|---|
| | Unaged | Aged* | Chg. | |
| CV-AR4000 | 559 | 790 | +231 | 41.0 |
| CV-AR400 plus 4% Ex 11 | 407 | 474 | +67 | 16.5 |
| MCA-AC 20 | 687 | 1244 | +557 | 81.0 |
| MCA-AC 20 plus 2% Ex 11 | 811 | 1043 | +232 | 28.6 |
| MCA-AC 20 plus 4% Ex 11 | 514 | 711 | +197 | 38.3 |

*14 Days at 104° F.

TABLE X

INDIRECT TENSILE TEST RESULTS
LABORATORY STANDARD AGGREGATE
TESTED AFTER 14 DAYS
AGING AT 104° F.
ALL DATA AVERAGE OF THREE SPECIMENS
TEST TEMPERATURE: 39.2° F.

| MIXTURE CONTAINING | TENSILE STRENGTH (psi) | STRAIN (in/in × $10^3$) | ELASTIC MODULUS* (psi) |
|---|---|---|---|
| CV-AR4000 | 253 | 2.2 | 228800 |
| CV-AR4000 plus 4% Ex 11 | 191 | 3.9 | 98000 |
| MCA-AC 20 | 166 | 6.6 | 50300 |
| MCA-AC 20 plus 2% Ex 11 | 139 | 8.7 | 32600 |
| MCA-AC 20 plus 4% Ex 11 | 122 | 7.4 | 33200 |

*Elastic modulus is calculated as the Secant Modulus at failure assuming Poisson's Ratio as 0.33.

EXAMPLE Q

More testing was conducted with an aggregate supplied by the California Department of Transportation. It is an aggregate mixture commonly available in the Sacramento area. A detailed description appears on Table XI. Mixing was accomplished at 280° F. in a Hobart mixer. 20 blows per side of a mechanical Marshall Hammer were utilized to produce specimen air voids of 3 to 4%.

TABLE XI

CALTRANS LOCAL AGGREGATE MIX DESIGN

| COMPONENT | |
|---|---|
| 84-1408 (¾"-½") | 15% |
| 84-1409 (½"-⅜") | 20% |
| 84-1410 (⅜"-#4) | 15% |
| 84-1412 (#4-Dust) | 45% |
| 84-1413 (Sand) | 5% |

| GRADATION | (% PASSING) |
|---|---|
| ¾" | 100.0 |
| ½" | 85.0 |
| ⅜" | 70.0 |
| #4 | 53.0 |
| #8 | 41.0 |
| #16 | 29.0 |
| #30 | 21.0 |
| #50 | 13.0 |
| #100 | 9.0 |
| #200 | 6.0 |

| ASPHALT CEMENT CONTENT |
|---|
| 5.3% wt. |

TABLE XII

MARSHALL STABILITY TEST RESULTS
CALTRANS SACRAMENTO AGGREGATE
ASTM D1559
SPECIMENS TESTED AFTER 9 DAYS AGING AT 140° F.
ALL DATA AVERAGE OF THREE SPECIMENS

| MIXTURE CONTAINING: | MARSHALL STABILITY | | | | MARSHALL FLOW | |
|---|---|---|---|---|---|---|
| | Before Aging | After Aging | Change | % Chg. | Before Aging | After Aging |
| CV-AR4000 | 1896 | 2196 | +300 | 15.8 | 12 | 14.0 |
| CV-AR4000 plus 2% Ex 11 | 2129 | 2146 | +17 | 0.8 | 12 | 13.0 |
| CV-AR4000 plus 4% Ex 11 | 1871 | 1992 | +121 | 6.5 | 14 | 16.0 |
| CC-AR4000 | 1214 | 1431 | +217 | 17.9 | 12 | 16.0 |
| CC-AR4000 plus 4% Ex 11 | 1162 | 1246 | +84 | 7.2 | 15 | 18.0 |
| CC-AR4000 plus 4% Ex 11 | 1046 | 1240 | +194 | 18.5 | 14 | 14.0 |

INDIRECT TENSILE TEST RESULTS
CALTRANS SACRAMENTO AGGREGATE
SPECIMENS TESTED AFTER 9 DAYS STORAGE AT 140° F.
ALL DATA AVERAGE OF THREE SPECIMENS
TEST TEMPERATURE 39.2° F.

| MIXTURE CONTAINING: | TENSILE STRENGTH (psi) | STRAIN (in/in × $10^{-3}$) | ELASTIC MODULUS* (psi) |
|---|---|---|---|
| CV-AR4000 | 360 | 4.4 | 165,400 |
| CV-AR4000 plus 2% Ex 11 | 242 | 4.2 | 117,100 |
| CV-AR4000 plus 4% Ex 11 | 188 | 5.2 | 72,000 |

*Elastic Modulus is calculated as the Secant Modulus at Failure assuming Poisson's Ratio as 0.33

What is claimed is:

1. A sulfurized composition prepared by reacting in two stages, a first stage at temperatures from about 50 to about 130° C., then a second stage at temperatures from about 150 to about 350° C., a sulfurizing agent with
   (A) at least one fatty acid ester of a polyhydric alcohol, or
   (B) at least one fatty acid, fatty acid ester of a monohydric alcohol, or a mixture thereof, or
   (C) at least one other olefin, or
   (D) mixtures of any two or more of (A), (B) and (C), in the presence of a catalytic amount of
   (E) at least one salt of at least one dithiocarbamic acid of the formula $R_1(R_2)N-CSSH$ wherein $R_1$ and $R_2$ are each independently hydrocarbyl groups, or
   (F) at least one mercapto benzothiazole, or
   (G) mixtures of (E) and (F).

2. The sulfurized composition of claim 1 wherein the salt of dithiocarbamic acid (E) is metal salt.

3. The sulfurized composition of claim 1 wherein the mercapto benzothiazole (F) is a metal salt.

4. The sulfurized composition of claim 2 wherein the metal salt is a Group II metal salt.

5. The sulfurized composition of claim 1 wherein the catalyst is (F) at least one Group II metal salt of a mercapto benzothiazole.

6. The sulfurized composition of claim 1 wherein the sulfurizing agent is sulfur.

7. The sulfurized composition according to claim 1 wherein the catalyst is (E) at least one metal salt of at least one dithiocarbamic acid of the formula $R_1(R_2)N-CSSH$ wherein $R_1$ and $R_2$ are each independently hydrocarbyl groups.

8. The sulfurized composition of claim 4 wherein $R_1$ and $R_2$ are each independently alkyl groups containing from 1 to about 20 carbon atoms.

9. The sulfurized composition of claim 1 wherein the other olefin (C) is at least one aliphatic, aryl aliphatic or alicyclic olefinic hydrocarbon containing at least 3 carbon atoms.

10. The sulfurized composition of claim 1 wherein the other olefin (C) is an aliphatic olefin which may be propylene, butylene or isobutylene, and dimers, trimers, tetramers and low molecular weight polymers thereof.

11. The sulfurized composition of claim 1 wherein (C) is at least one aliphatic olefin containing from about 8 to about 36 carbon atoms.

12. The sulfurized composition of claim 1 wherein the aliphatic olefin is an aliphatic alphaolefin.

13. The sulfurized composition of claim 12 wherein the olefin is an isomerized aliphatic alpha olefin.

14. The sulfurized composition of claim 1 wherein the olefin (C) is at least one Diels-Alder adduct of at least one dienophile with at least one aliphatic conjugated diene.

15. The sulfurized composition of claim 1 wherein the other olefin (C) is at least one terpene compound.

16. The sulfurized composition of claim 1 prepared from a mixture comprising
    (A) about 100 parts by weight of at least one fatty acid ester of a polyhydric alcohol, and
    (C) from about 25 to about 400 parts by weight of at least one other olefin.

17. The sulfurized composition of claim 16 wherein the olefin is at least one aliphatic olefin containing from about 3 to about 36 carbon atoms.

18. The sulfurized composition of claim 16 wherein the mixture contains from about 25 to 100 parts by weight of olefin (C).

19. A sulfurized composition prepared by reacting in two stages, a first stage at temperatures from about 50° to about 130° C., then a second stage at temperatures from about 150° to about 350° C., a sulfurizing agent with a mixture comprising
    (A) about 100 parts by weight of at least one fatty acid ester of a polyhydric alcohol,
    (B) from about 2 to about 200 parts by weight of at least one fatty acid, fatty acid ester of a monohydric alcohol, or a mixture thereof, and optionally
    (C) from about 2 to about 400 parts by weight of at least one other olefin in the presence of a catalytic amount of
    (E) at least one salt of at least one dithiocarbamic of the formula

wherein $R_1$ and $R_2$ are each independently hydrocarbyl groups containing from 1 to about 20 carbon atoms, or
    (F) at least one mercapto benzothiazole, or
    (G) mixtures of (E) and (F).

20. The sulfurized composition of claim 19 wherein the salt (E) is a metal salt.

21. The sulfurized composition of claim 19 wherein the salt (F) is a metal salt.

22. The sulfurized composition of claim 19 wherein the sulfurizing agent is sulfur.

23. The sulfurized composition of claim 19 wherein the reaction is conducted in two stages, a first stage at from about 50° to about 130° C., then a second stage at about 150° to about 200° C.

24. The sulfurized composition of claim 19 wherein the mixture contains from about 2 to about 200 parts of at least one other olefin (C).

25. The sulfurized composition of claim 19 wherein the mixture contains from about 25 to about 100 parts of the olefin (C).

26. The sulfurized composition of claim 19 wherein the other olefin (C) is at least one aliphatic olefin containing from about 3 to about 36 carbon atoms.

27. The sulfurized composition of claim 26 wherein the olefin is an alpha-olefin.

28. The sulfurized composition of claim 26 wherein the olefin (C) is an isomerized alpha-olefin.

29. The sulfurized composition of claim 26 wherein the other olefin (C) is at least one terpene compound.

30. The sulfurized composition of claim 19 wherein the mixture contains a catalytic amount of a Group II metal salt of the dithiocarbamic acid.

31. The sulfurized composition of claim 19 wherein the mixture contains a catalytic amount of a Group II metal salt of the mercapto benzothiazole.

32. The sulfurized composition of claim 19 wherein the fatty acid ester (A) is a fatty oil.

33. The sulfurized composition of claim 19 wherein the olefin (C) is an olefin containing from about 10 to about 20 carbon atoms.

34. An additive concentrate comprising a substantially inert, normally liquid diluent and from about 20 to about 90% by weight of the sulfurized composition of claim 1.

35. An additive concentrate comprising a substantially inert, normally liquid diluent and from about 20 to about 90% by weight of the composition of claim 10.

36. An additive concentrate comprising a substantially inert, normally liquid diluent and from about 20 to about 90% by weight of the composition of claim 13.

37. An additive concentrate comprising a substantially inert, normally liquid diluent and from about 20 to about 90% by weight of the composition of claim 24.

38. A lubricating oil composition comprising a major amount of an oil of lubricating viscosity and a minor, property improving amount of the composition of claim 1.

39. A lubricating oil composition comprising a major amount of an oil of lubricating viscosity and a minor, property improving amount of the composition of claim 16.

40. A lubricating oil composition comprising a major amount of an oil of lubricating viscosity and a minor, property improving amount of the composition of claim 19.

41. A method for lubricating metal during working thereof which comprises applying to said metal, a composition comprising a major amount of a lubricating oil and a minor amount of the sulfurized composition of claim 1.

42. A method for lubricating metal during working thereof which comprises applying to said metal, a composition comprising a major amount of a lubricating oil and a minor amount of the sulfurized composition of claim 16.

43. A method for lubricating metal during working thereof which comprises applying to said metal, a composition comprising a major amount of a lubricating oil and a minor amount of the sulfurized composition of claim 19.

44. The method of claim 41 wherein the composition also contains a minor amount of at least one chlorinated wax.

45. The method of claim 43 wherein the composition also contains a minor amount of at least one chlorinated wax.

46. The composition of claim 1 wherein the reaction is conducted for about 6 to about 12 hours during the first stage and for about 3 to about 6 hours during the second stage.

47. The composition of claim 46 wherein the reaction is conducted at about 130° C. during the first stage, at about 150° C. during the second stage, then is further reacted for about 3 hours at about 180° C.

48. The composition of claim 19 wherein the reaction is conducted for about 6 to about 12 hours during the first stage and for about 3 to about 6 hours during the second stage.

49. A sulfurized composition prepared by reacting in two stages, a first stage at temperatures from about 50° to about 130° C., then a second stage at temperatures from about 150° to about 350° C., a sulfurizing agent with a mixture comprising
   (C) about 100 parts by weight of at least one other olefin, and
   (B) from about 2 to about 200 parts by weight of at least one fatty acid, fatty acid ester of a monohydric alcohol, or a mixture thereof, and optionally
   (A) about 100 parts by weight of at least one fatty acid ester of a polyhydric alcohol, in the presence of a catalytic amount of
   (E) at least one salt of at least one dithiocarbamic acid of the formula $R_1(R_2)N-CSSH$ wherein $R_1$ and $R_2$ are each independently hydrocarbyl groups containing from 1 to about 20 carbon atoms, or
   (F) at least one metal salt of at least one mercapto benzothiazole, or
   (G) mixtures of (F) and (G).

50. The composition of claim 49 wherein the reaction is conducted for about 6 to about 12 hours during the first stage and for about 3 to about 6 hours during the second stage.

51. The sulfurized composition of claim 49 wherein the sulfurizing agent is sulfur.

52. The sulfurized composition of claim 49 wherein the olefin (C) is an aliphatic olefin containing from about 8 to about 36 carbon atoms.

53. The sulfurized composition of claim 49 wherein the olefin (C) is at least one sulfurized Diels-Alder adduct of at least one dienophile with at least one aliphatic conjugated diene.

54. The composition of claim 53 wherein the dienophile comprises an alpha, beta-ethylenically unsaturated aliphatic carboxylic acid ester, carboxylic acid amide, halide, nitrile, aldehyde, ketone, or mixtures thereof.

55. The composition of claim 53 wherein the aliphatic conjugated diene corresponds to the formula

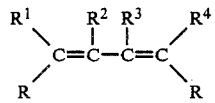

wherein R through $R^5$ are each independently selected from the group consisting of hydrogen, alkyl, halo, alkoxy, alkenyl, alkenyloxy, carboxy, cyano, amino, alkylamino, dialkylamino, phenyl, and phenyl substituted with one to three substituents corresponding to R through $R^5$, or R, $R^2$, $R^3$ and $R^5$ are as described and $R^1$ and $R^4$ are alkylene groups joined together to form a cyclic diene.

56. The composition of claim 55 wherein $R^2$ and $R^3$ are hydrogen, and R, $R^1$, $R^4$ and $R^5$ are each independently hydrogen, halo, or lower alkyl.

57. The composition of claim 54 wherein the dienophile is further characterized in that it contains at least one, but not more than two $-C(O)OR_0$ groups wherein $R_0$ is residue of a saturated aliphatic alcohol of up to about 40 carbon atoms.

58. The composition according to claim 55 wherein the diene is piperylene, isoprene, methylisoprene, chloroprene, 1,3-butadiene, or mixtures thereof.

59. The composition according to claim 58 wherein the diene is 1,3-butadiene.

60. The composition according to claim 55 wherein said dienophile is an ester of acrylic acid or methacrylic acid.

61. The sulfurized composition of claim 49 wherein the catalyst is a Group II metal salt of the dithiocarbamic acid.

62. The sulfurized composition of claim 49 wherein the catalyst is a Group II metal salt of a mercaptobenzothiazole.

63. The sulfurized composition of claim 49 wherein the fatty acid (B) is tall oil or other fatty acid mixture containing oleic acid.

64. The sulfurized composition of claim 49 wherein the amount of catalyst present is from about 0.0001 to about 5 parts by weight per 100 parts of the combined weight of (A), (B) and (C).

65. A lubricating oil composition comprising a major amount of an oil of lubricating viscosity and a minor, property improving amount of the composition of claim 49.

66. A method for lubricating metal during working thereof which comprises applying to said metal, a composition comprising a major amount of a lubricating oil and a minor amount of the sulfurized composition of claim 49.

67. The method of claim 66 wherein the composition also contains a minor amount of at least one chlorinated wax.

68. The sulfurized composition of claim 49 wherein the olefin (C) is an aliphatic alpha-olefin.

69. The sulfurized composition of claim 49 wherein the olefin (C) is an isomerized aliphatic alipha-olefin.

70. The sulfurized composition of claim 49 wherein the olefin (C) is at least one terpene compound.

71. An asphalt composition comprising a major amount of asphalt and a minor, stability improving amount of a sulfurized composition prepared by reacting at an elevated temperature, a sulfurizing agent with
   (A) at least one fatty acid ester of a polyhydric alcohol, or
   (B) at least one fatty acid ester of a monohydric alcohol, or
   (C) at least one other olefin selected from the group consisting of monoolefins and terpenes, or
   (D) mixtures of any two or more of (A), (B) and (C) optionally in the presence of a catalytic amount of
   (E) at least one salt of at least one dithiocarbamic acid of the formula $R_1(R_2)N-CSSH$ wherein $R_1$ and $R_2$ are each independently hydrocarbyl groups, or
   (F) at least one mercapto benzothiazole, or
   (G) mixture of (E) and (F).

72. An asphalt concrete comprising a major amount of at least one aggregate and a minor amount of asphalt cement containing a stabilized asphalt composition of claim 71.

73. The asphalt composition of claim 71 wherein the salt of dithiocarbamic acid (E) is a metal salt.

74. The asphalt composition of claim 71 wherein the mercapto benzothiazole (F) is a metal salt.

75. The asphalt composition of claim 73 wherein the metal salt is a Group II metal salt.

76. The asphalt composition of claim 71 wherein the catalyst is (F) at least one Group II metal salt of mercapto benzothiazole.

77. The asphalt composition of claim 71 wherein the sulfurizing agent comprises at least one member of the group consisting of elemental sulfur, hydrogen sulfide, sulfur halide and sodium sulfide, and a mixture of hydrogen sulfide and sulfur dioxide.

78. The asphalt composition of claim 71 wherein the sulfurizing agent comprises sulfur.

79. The asphalt composition of claim 71 wherein the reaction is conducted at a temperature of from about 50° to about 350° C.

80. The asphalt composition of claim 78 wherein the sulfurizing agent further comprises hydrogen sulfide.

81. The asphalt composition of claim 71 wherein the (C) is at least one aliphatic, aryl aliphatic or alicyclic olefinic hydrocarbon containing at least 3 carbon atoms.

82. The asphalt composition of claim 71 wherein the (C) is an aliphatic olefin which may be propylene, butylene or isobutylene, and dimers, trimers, tetramers and low molecular weight polymers thereof.

83. The asphalt composition of claim 71 wherein (C) is at least one aliphatic olefin containing from about 8 to about 36 carbon atoms.

84. The asphalt composition of claim 71 wherein the monoolefin is an aliphatic alpha-olefin.

85. The asphalt composition of claim 79 wherein the monoolefin is an isomerized aliphatic alpha olefin.

86. The asphalt composition of claim 71 wherein the (C) is at least one Diels-Alder adduct of at least one dienophile with at least one aliphatic conjugated diene.

87. The asphalt composition of claim 71 wherein the (C) is at least one terpene compound.

88. The asphalt composition of claim 71 wherein the sulfurized composition is prepared from a mixture comprising
(A) about 100 parts by weight of at least one fatty acid ester of a polyhydric alcohol, and
(C) from about 0 to about 400 parts by weight of at least one other olefin.

89. The composition of claim 83 wherein the olefin is at least one aliphatic olefin containing from about 3 to about 36 carbon atoms.

90. The asphalt composition of claim 83 wherein the mixture contains from about 25 to 100 parts by weight of olefin (C).

91. An asphalt composition comprising a major amount of an asphalt and a minor, stability improving amount of a sulfurized composition prepared by reacting at an elevated temperature, a sulfurizing agent with a mixture comprising
(A) about 100 parts by weight of at least one fatty acid ester of a polyhydric alcohol,
(B) from about 0 to about 200 parts by weight of at least one fatty acid, fatty acid ester of a monohydric alcohol, or a mixture thereof, and
(C) from about 0 to about 400 parts by weight of at least one other olefin in the presence of a catalytic amount of
(E) at least one salt of at least one dithiocarbamic acid of the formula $R_1(R_2)N\text{---}CSSH$ wherein $R_1$ and $R_2$ are each independently hydrocarbyl groups containing from 1 to about 20 carbon atoms, or
(F) at least one mercapto benzothiazole, or
(G) mixtures of (E) and (F).

92. An asphalt concrete comprising a major amount of at least one aggregate and a minor amount of asphalt cement containing a stabilized asphalt composition of claim 91.

93. The composition of claim 91 wherein the salt (E) is a metal salt.

94. The asphalt composition of claim 91 wherein the salt (F) is a metal salt.

95. The asphalt composition of claim 91 wherein the sulfurizing agent is sulfur.

96. The asphalt composition according to claim 90 wherein the reaction is conducted at a temperature of from about 50° to about 350° C.

97. The asphalt composition of claim 91 wherein the reaction is conducted at a temperature of from aboout 50° to about 200° C.

98. The asphalt composition of claim 91 wherein the mixture contains from about 2 to about 200 parts of at least one other olefin (C).

99. The asphalt composition of claim 91 wherein the mixture contains from about 25 to about 100 parts of the olefin (C).

100. The asphalt composition of claim 91 wherein the other olefin (C) is at least one aliphatic olefin containing from about 3 to about 36 carbon atoms.

101. The asphalt composition of claim 100 wherein the olefin is an alpha-olefin.

102. The asphalt composition of claim 100 wherein the olefin (C) is an isomerized alpha-olefin.

103. The asphalt composition of claim 100 wherein the other olefin (C) is at least one terpene compound.

104. The asphalt composition of claim 91 wherein the mixture contains a sulfurized composition prepared in the presence of a catalytic amount of a Group II metal salt of the dithiocarbamic acid.

105. The asphalt composition of claim 91 wherein the mixture contains a sulfurized composition prepared in the presence of a catalytic amount of a Group II metal salt of the mercapto benzothiazole.

106. The asphalt composition of claim 91 wherein the fatty acid ester (A) is a fatty oil.

107. The asphalt composition of claim 91 wherein the olefin (C) is an olefin containing from about 10 to about 20 carbon atoms.

108. An asphalt composition comprising a major amount of asphalt and a minor, stability improving amount of a sulfurized composition prepared by reacting at an elevated temperature, a sulfurizing agent with a mixture comprising
(A) from about 0 to 100 parts by weight of at least one fatty acid ester of a polyhydric alcohol,
(B) from about 0 to about 200 parts by weight of at least one fatty acid, fatty acid ester of a monohydric alcohol, or a mixture thereof, and (C) about 100 parts by weight of at least one other olefin, in the presence of a catalytic amount of
(E) at least one salt of at least one dithiocarbamic acid of the formula $R_1(R_2)N-CSSH$ wherein $R_1$ and $R_2$ are each independently hydrocarbyl groups containing from 1 to about 20 carbon atoms, or
(F) at least one metal salt of at least one mercapto benzothiazole, or
(G) mixtures of (E) and (F).

109. An asphalt concrete comprising a major amount of at least one aggregate and a minor amount of asphalt cement containing a stabilized asphalt composition of claim 108.

110. The asphalt composition of claim 108 wherein the sulfurizing agent is sulfur.

111. The asphalt composition of claim 108 wherein the reaction is conducted at a temperature of from about 50° to about 350° C.

112. The asphalt composition of claim 108 wherein the olefin (C) is an aliphatic olefin containing from about 8 to about 36 carbon atoms.

113. The asphalt composition of claim 108 wherein the olefin (C) is at least one sulfurized Diels-Alder adduct of at least one dienophile with at least one aliphatic conjugated diene.

114. The asphalt composition of claim 113 wherein the dienophile comprises an alpha,beta-ethylenically unsaturated aliphatic carboxylic acid ester, carboxylic acid amide, halide, nitrile, aldehyde, ketone, or mixtures thereof.

115. The asphalt composition of claim 113 wherein the aliphatic conjugated diene corresponds to the formula

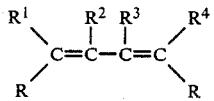

wherein R through $R^5$ are each independently selected from the group consisting of hydrogen, alkyl, halo, alkoxy, alkenyl, alkenyloxy, carboxy, cyano, amino, alkylamino, dialkylamino, phenyl, and phenyl substituted with one to three substituents corresponding to R through $R^5$, or R, $R^2$, $R^3$ and $R^5$ are as described and $R^1$ and $R^4$ are alkylene groups joined together to form a cyclic diene.

116. The asphalt composition of claim 115 wherein $R^2$ and $R^3$ are hydrogen, and R, $R^1$, $R^4$ and $R^5$ are each indepen-dently hydrogen, halo, or lower alkyl.

117. The asphalt composition of claim 108 wherein the dienophile is further characterized in that it contains at least one, but not more than two —$C(O)OR_0$ groups wherein $R_0$ is residue of a saturated aliphatic alcohol of up to about 40 carbon atoms.

118. The asphalt composition according to claim 113 wherein the diene is piperylene, isoprene, methylisoprene, chloroprene, 1,3-butadiene, or mixtures thereof.

119. The asphalt composition according to claim 118 wherein the diene is 1,3-butadiene.

120. The asphalt composition according to claim 117 wherein said dienophile is an ester of acrylic acid or methacrylic acid.

121. The asphalt composition of claim 108 wherein the catalyst is a Group II metal salt of the dithiocarbamic acid.

122. The asphalt composition of claim 108 wherein the catalyst is a Group II metal salt of a mercaptobenzothiazole.

123. The asphalt composition of claim 108 wherein the fatty acid (B) is tall oil or other fatty acid mixture containing oleic acid.

124. The asphalt composition of claim 108 wherein the amount of catalyst present is from about 0.0001 to about 5 parts by weight per 100 parts of the combined weight of (A), (B) and (C).

125. The asphalt composition of claim 108 wherein the olefin (C) is an aliphatic alpha-olefin.

126. The asphalt composition of claim 108 wherein the olefin (C) is an isomerized aliphatic alpha-olefin.

127. The asphalt composition of claim 108 wherein the olefin (C) is at least one terpene compound.

* * * * *

UNITED STATES PATENT AND TRADEMARK OFFICE
CERTIFICATE OF CORRECTION

PATENT NO. : 4,740,322

DATED : April 26, 1988

INVENTOR(S) : Stephen A. Di Biase, et al

It is certified that error appears in the above-identified patent and that said Letters Patent is hereby corrected as shown below:

Summary Page, Left Column:

At [75] Inventors:, "Stephen A. Di Biase, Euclid; Roger L. Sowerby, Mentor, both of Ohio" should be --Stephen A. Di Biase, Euclid; Roger L. Sowerby, Mentor; William A. Higgins, Gates Mills, all of Ohio--

Signed and Sealed this

Sixth Day of September, 1988

Attest:

DONALD J. QUIGG

Attesting Officer

Commissioner of Patents and Trademarks